March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 1

INVENTORS:
John C. Graf & John R. Graf

BY Paul & Paul

ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 2

INVENTORS:
John C. Graf & John R. Graf

BY Paul & Paul

ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 3

INVENTORS:
John C. Graf & John R. Graf
BY Paul & Paul
ATTORNEYS.

March 22, 1955 J. C. GRAF ET AL 2,704,608

LOADING AND UNLOADING MECHANISM FOR MULTI-PLATEN PRESSES

Filed Oct. 6, 1950

23 Sheets-Sheet 4

INVENTORS:
John C. Graf & John R. Graf

BY Paul & Paul

ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 5

INVENTORS:
John C. Graf & John R. Graf

BY Paul & Paul

ATTORNEYS.

INVENTORS:
John C. Graf & John R. Graf
BY Paul & Paul
ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 7

INVENTORS:
John C. Graf & John R. Graf

BY Paul & Paul

ATTORNEYS.

LOADING AND UNLOADING MECHANISM FOR MULTI-PLATEN PRESSES

Filed Oct. 6, 1950 23 Sheets-Sheet 8

INVENTORS:
John C. Graf & John R. Graf
BY Paul & Paul
ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 9

INVENTORS:
John C. Graf & John R. Graf
BY Paul & Paul
ATTORNEYS.

LOADING AND UNLOADING MECHANISM FOR MULTI-PLATEN PRESSES

Filed Oct. 6, 1950

INVENTORS:
John C. Graf & John R. Graf
BY Paul & Paul
ATTORNEYS.

LOADING AND UNLOADING MECHANISM FOR MULTI-PLATEN PRESSES

Filed Oct. 6, 1950 23 Sheets-Sheet 11

INVENTORS:
John C. Graf & John R. Graf
BY Paul & Paul
ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 12

INVENTORS:
John C. Graf & John R. Graf

BY Paul & Paul

ATTORNEYS.

INVENTORS:
John C. Graf & John R. Graf
BY Paul & Paul
ATTORNEYS.

LOADING AND UNLOADING MECHANISM FOR MULTI-PLATEN PRESSES

INVENTORS:
John C. Graf & John R. Graf
BY Paul & Paul
ATTORNEYS.

LOADING AND UNLOADING MECHANISM FOR MULTI-PLATEN PRESSES

Filed Oct. 6, 1950 23 Sheets-Sheet 15

INVENTORS:
John C. Graf & John R. Graf
BY Paul & Paul
ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 16

INVENTORS:
John C. Graf & John R. Graf
BY Paul & Paul
ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 17

INVENTORS:
John C. Graf & John R. Graf
BY Paul & Paul
ATTORNEYS.

INVENTORS:
John C. Graf & John R. Graf
BY Paul & Paul
ATTORNEYS.

INVENTORS:
John C. Graf & John R. Graf
BY Paul & Paul
ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 20

INVENTORS:
John C. Graf & John R. Graf
BY Paul & Paul
ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 21

INVENTORS:
John C. Graf & John R. Graf

BY Paul & Paul

ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 22

INVENTORS:
John C. Graf & John R. Graf

BY Paul & Paul

ATTORNEYS.

March 22, 1955 J. C. GRAF ET AL 2,704,608

LOADING AND UNLOADING MECHANISM FOR MULTI-PLATEN PRESSES

Filed Oct. 6, 1950 23 Sheets-Sheet 23

INVENTORS:
John C. Graf & John R. Graf
BY Paul & Paul
ATTORNEYS.

United States Patent Office 2,704,608

Patented Mar. 22, 1955

2,704,608

LOADING AND UNLOADING MECHANISM FOR MULTI-PLATEN PRESSES

John C. Graf, Philadelphia, and John R. Graf, Abington Township, Montgomery County, Pa.; said John R. Graf assignor to John C. Graf Application October 6, 1950, Serial No. 188,696

31 Claims. (Cl. 214—1)

This invention relates to mechanism for loading and unloading multi-platen presses, particularly presses designed for operation upon sheets or slabs of large sizes and areas.

The chief aim of our invention is to minimize the manual labor required in loading and unloading presses of the kind referred to, and to enable the loading and unloading to be accomplished quickly and efficiently with assurance against injury to the sheets or slabs. This objective is realized, as hereinafter more fully set forth, through provision of loading and unloading units arranged in line with the press respectively and disposed on opposite sides thereof, said units having elevators with shelves for the sheets or slabs spaced so as to be on corresponding levels with the platens of the press when the latter is open, manually-controllable power means for moving the elevators stepwise vertically for registry of the shelves successively at the levels of charging and receiving tables, and manually controlled power-operated ejecting means whereby, after the loading elevator has been filled, the sheets are concurrently transferred from the loading elevator into the press and previously pressed sheets at the same time transferred from the press to the unloading elevator.

In connection with loading and unloading units having the foregoing attributes, it is a further aim of our invention to provide means for easing the entry of the sheets or slabs from a charging table into the loading elevator and for accurately determining their position therein, as well as means for easing the withdrawal of the pressed sheets from the unloading elevator and onto a receiving table.

Another object of our invention is to incorporate in the control system, automatically-actuated safety means which will prevent the ejector from being operated while the press is closed, nor the elevators to be raised or lowered while the ejector is in operation.

Another object of our invention is to provide automatically actuated means to prevent jamming or injury to the ejector in the event, due to any cause, it meets with abnormal resistance during either its advance or retracting travel.

Other objects and attendant advantages will appear from the following detailed description of the attached drawings, wherein.

Figures 1, 19:
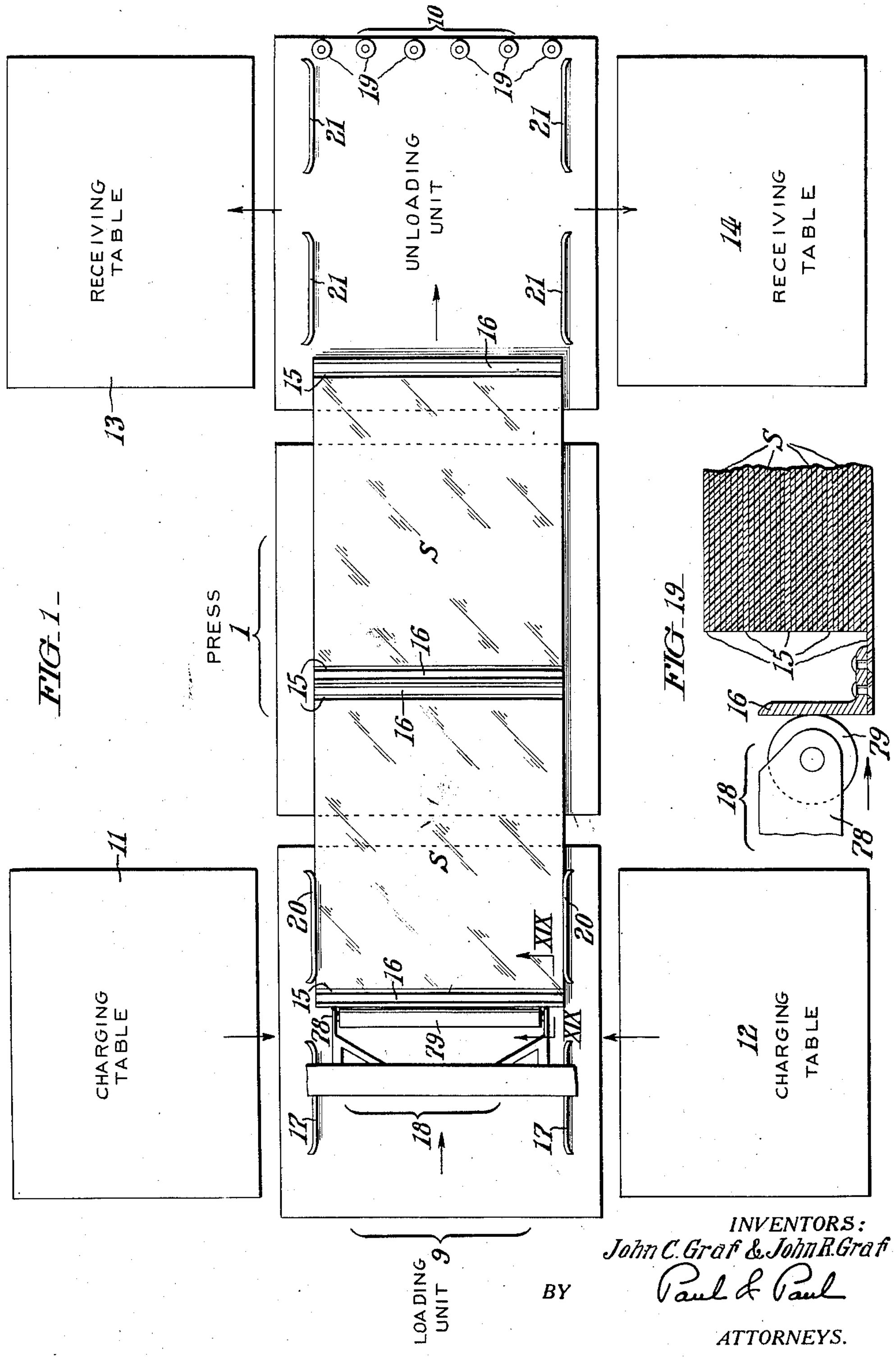
Fig. 1 is a diagrammatic view, in top plan, of a multi-platen press in association with loading and unloading units conveniently embodying our invention.
Fig. 19 is a detail view in section taken as indicated by the angled arrows XIX—XIX in Fig. 1.
Figure 2:
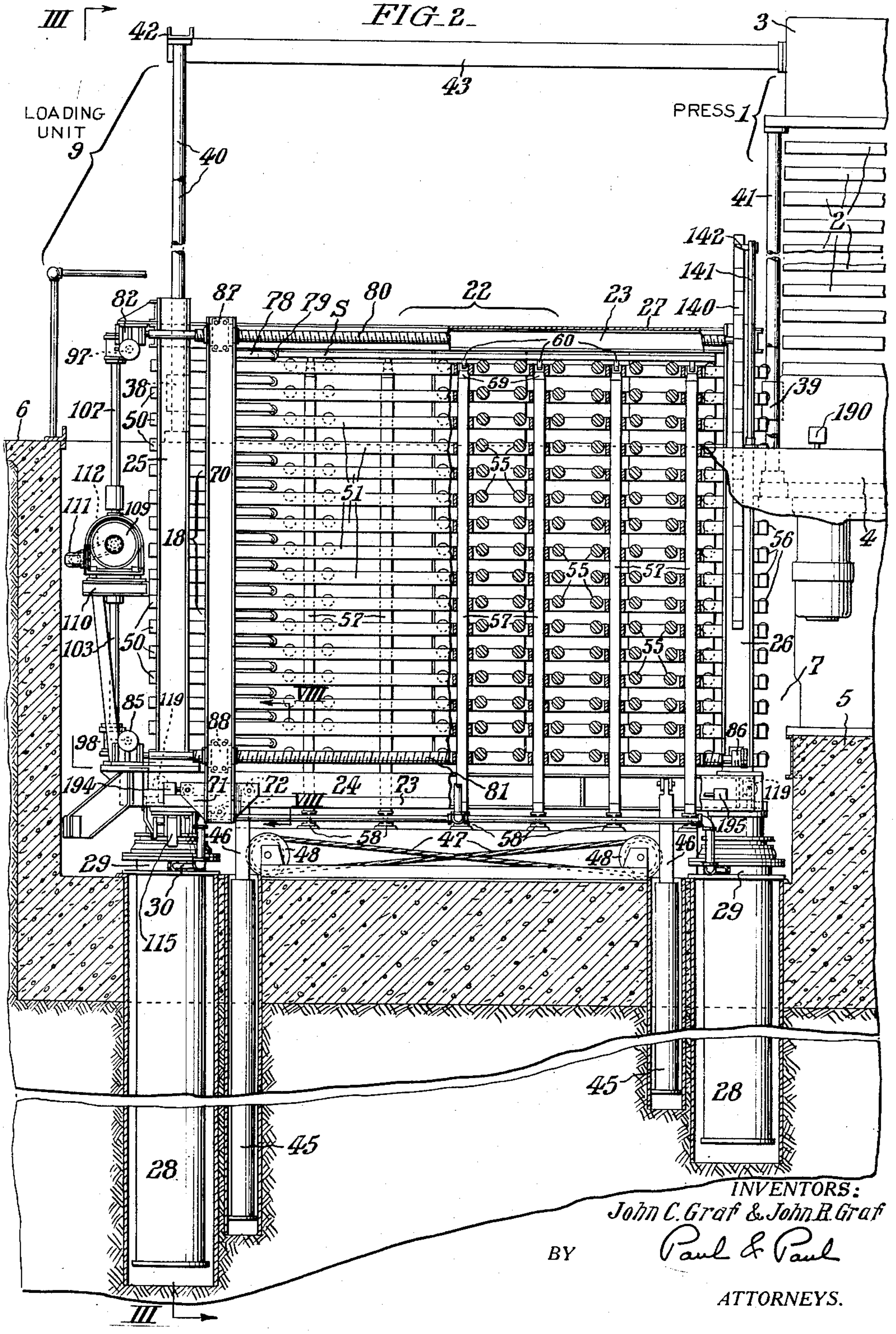
Fig. 2 shows the elevation of one side of the loading unit with portions broken away and indicated in section to better illustrate important structural details, the elevator of said unit being fully lowered in readiness to be charged.
Figure 3:
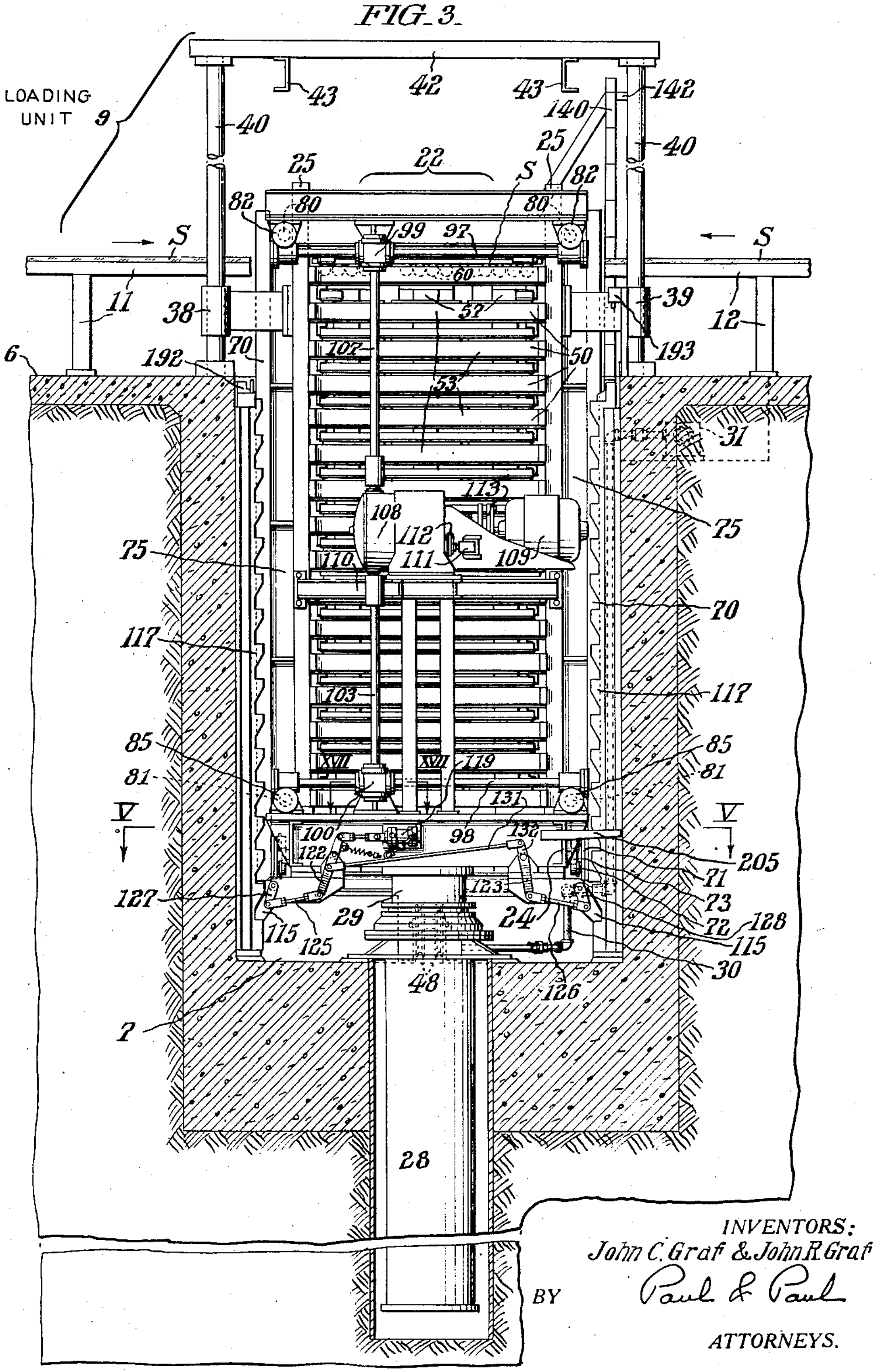
Fig. 3 is a view, looking as indicated by the angled arrows III—III in Fig. 2, and showing the loading unit in end elevation.

With more specific reference, first more particularly to Figs. 1–3 of these illustrations, the numeral 1 comprehensively designates a press with a multiple of platens 2 in superposed relation between a fixed upper head 3 and a vertically-movable lower head 4 which latter is adapted to be hydraulically operated. The press may be of any standard construction well known in the art and, as herein illustrated, is supported upon and suitably anchored to a foundation at depressed level 5 below a floor 6 which may be of concrete as conventionally indicated in Figs. 2 and 3. Upon opening of the press 1, the platens 2 are relatively spaced as shown for reception between them of sheets S of paper pulp, plastic or similar material which are to be compacted. Recessed into pits 7 and 8 respectively adjacent opposite ends of the press 1 are the loading and unloading units 9 and 10 with which our invention is more especially concerned; and adjacent opposite sides of said units are selectively usable charging and receiving tables 11, 12 and 13, 14 respectively from which the slabs or sheets are successively fed and onto which the sheets are successively discharged after pressing. In preparation for pressing, the individual sheets S or individual piles of them are placed on supporting plates or trays 15 of metal having reinforcing angle bars 16 secured along opposite edges thereof as shown in Figs. 1 and 19. In being fed into the loading unit 9, the sheets are arrested by locating stop guides 17 which are retractable for selective use depending upon which of the charging tables 11 or 12 is employed. An ejector mechanism 18 is embodied in the loading unit for the purpose of transferring the sheet trays 15 from said unit to the press 1, with incidental transfer at the same time, of the previously compressed sheets from the press to the unloading unit 10, as shown in Fig. 1, until arrested in the latter by stops in the form of rollers 19. For arresting the sheet trays 15 during such transfer, the loading and unloading units 9 and 10 are respectively provided with stop guides 20 and 21 which, like the stops 17 previously referred to, are retractable depending upon which of the receiving tables 13 or 14 is used.

*Loading unit*

From Figs. 2 and 3 it will be noted that the loading unit 9 comprises an elevator 22 having rectangular top and bottom frames 23 and 24 of structural steel which are connected at corners by channel uprights 25 and 26, the upper frame 23 having secured to it a roof plate 27. For raising and lowering the elevator 22, we have shown two ram cylinders 28 with the plungers 29 thereof connected to the bottom frame 24. Extending between the rams 28 is a pipe 30 (Fig. 4) which leads to a master slide valve 31 whereto compressed air is conducted from a source of supply (not shown) through a pipe main 32, and from which exhaust takes place through another pipe 33. The master valve 31 is arranged to be actuated by a cylinder 34 whereto compressed air is conducted, by way of a pipe line 35, under selective governance of two small pilot valves 36 and 37 which will again be referred to later. In its up and down travel, the elevator 22 is guided through sliding engagement of sleeve brackets 38 and 39 (Figs. 2 and 4) thereon with spaced cylindric posts 40 and 41 rising from the floor 6. At their upper ends, the posts 40 are connected by a transverse channel beam 42 which is braced from the fixed head 3 of the press 1 by a pair of parallel channel members 43. The posts 41 are in turn braced through connection of their upper ends directly to the press head 3. The elevator 22 is stabilized in its operation by sunken dash pot cylinders 45 (Fig. 2) whereof the plungers 46 are connected to the bottom frame 24 adjacent the plungers 29 of the rams 28. A cable 47 trained about guide sheaves 48, with its ends respectively connected to the plungers 46, serves to equalize the movements of the latter.

Figure 4:
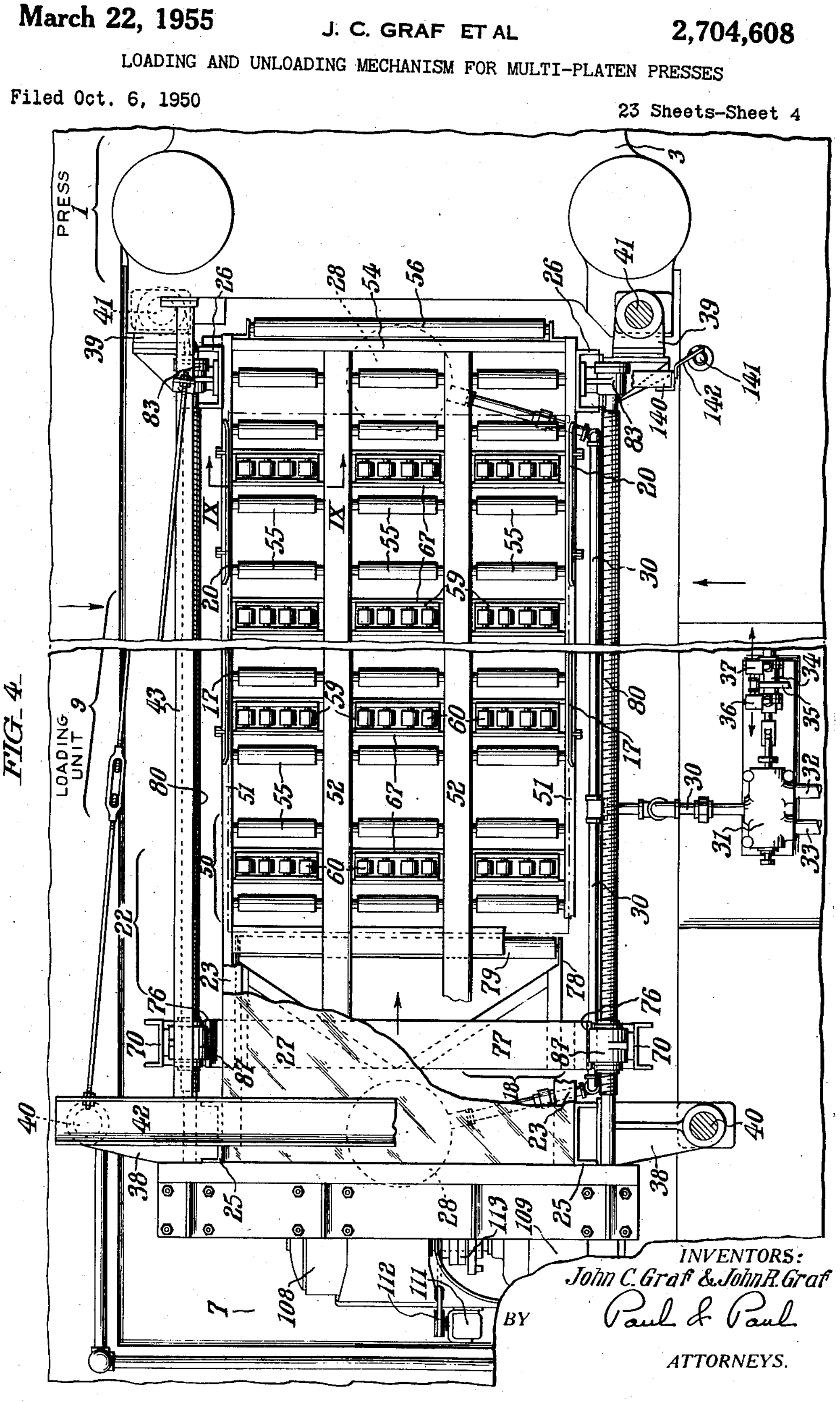
Fig. 4 shows the loading unit in top plan with the roof plate of its elevator partly broken away to expose the parts beneath.
Figures 5, 6, 7:
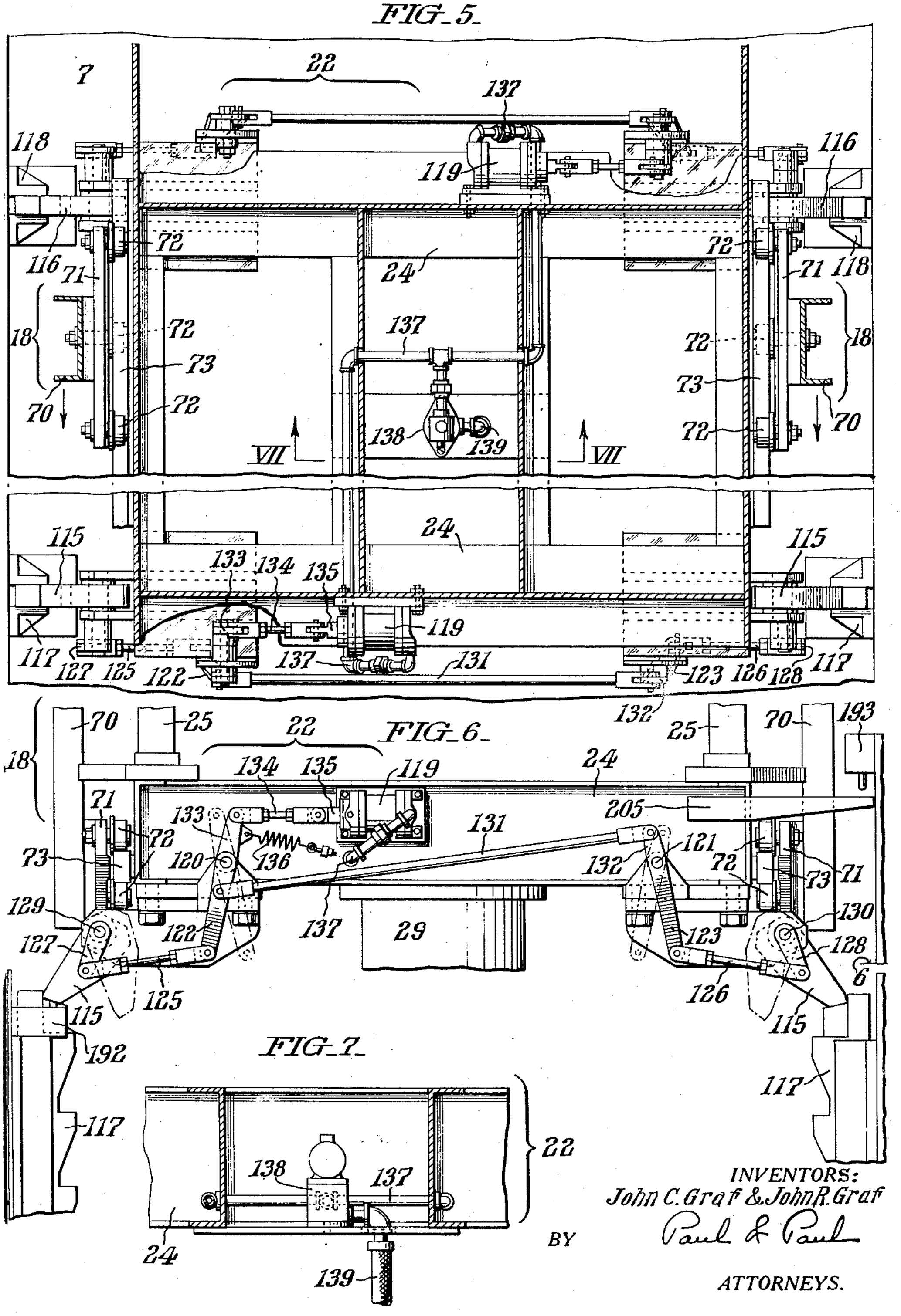
Fig. 5 is a horizontal section taken as indicated by the angled arrows V—V in Fig. 3 and drawn to a larger scale.
Fig. 6 is a fragmentary view in elevation looking from the bottom of Fig. 5.
Fig. 7 is a detail view in section taken as indicated by the angled arrows VII—VII in Fig. 5.
Figure 8:
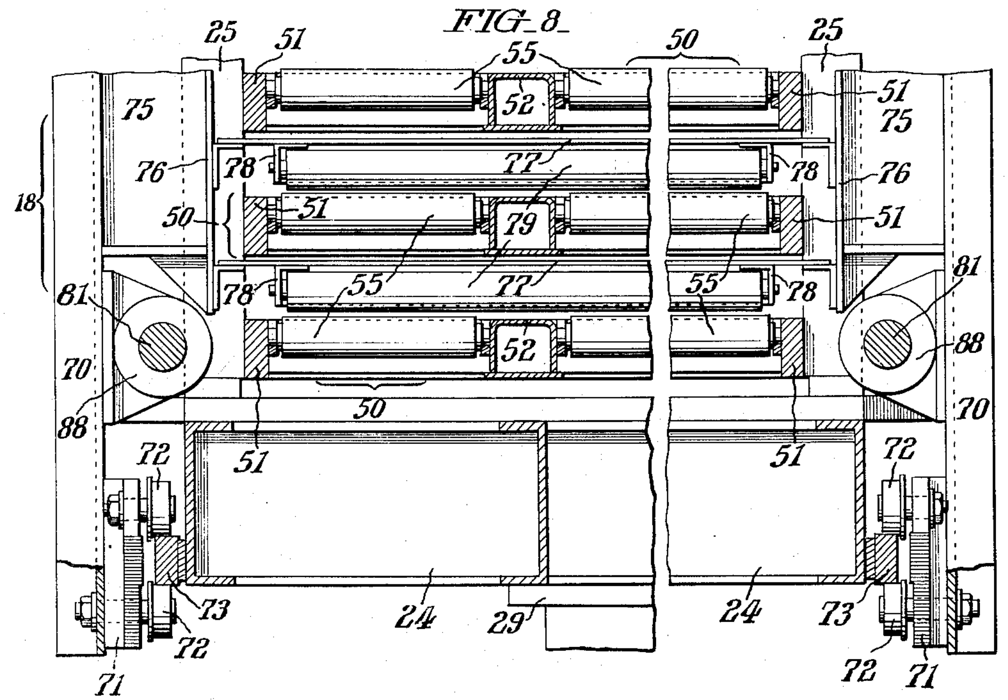
Fig. 8 is a fragmentary view in transverse section taken as indicated by the angled arrows VIII—VIII in Fig. 2, and likewise drawn to a larger scale.
Figure 9:
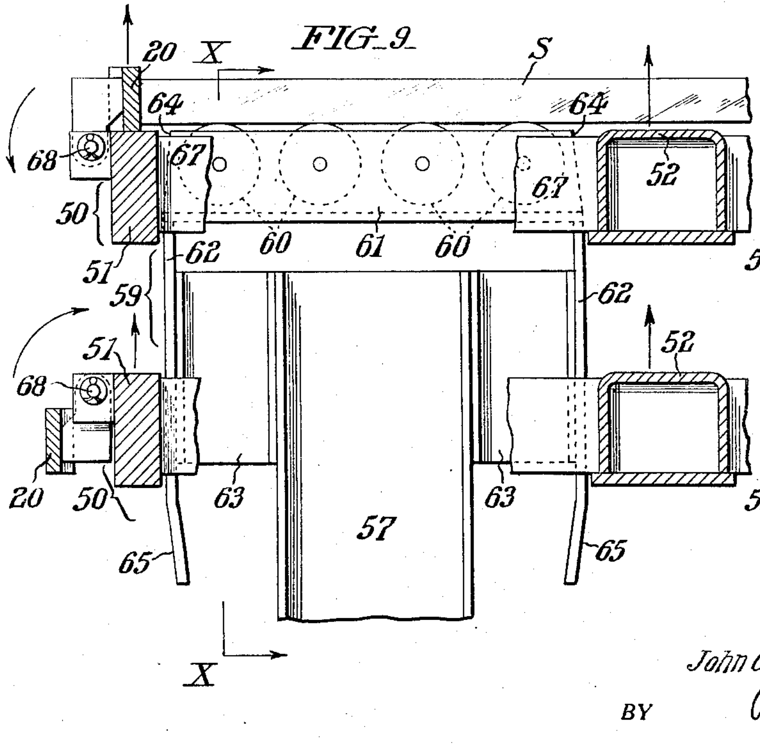
Fig. 9 is a fragmentary view in transverse section taken as indicated by the angled arrows IX—IX in Fig. 4.
Figure 10:
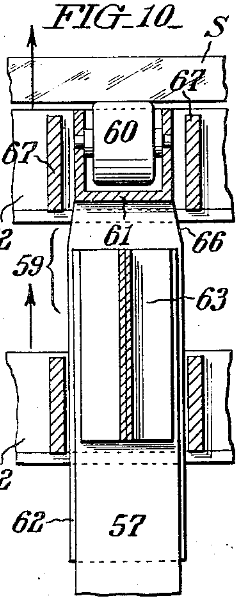
Fig. 10 is a fragmentary view in vertical section taken as indicated by the angled arrows X—X in Fig. 9.
Figure 11:
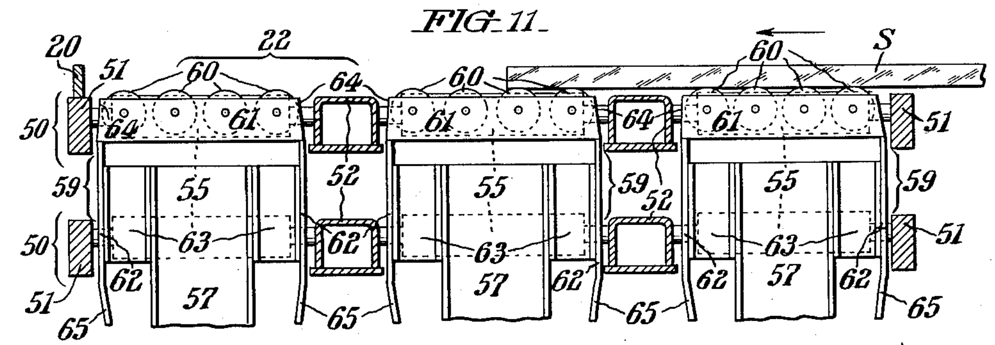
Figs. 11, 12 and 13 are fragmentary views in section corresponding to Fig. 9, and showing successive steps in charging the elevator of the loading unit.
Figure 12:
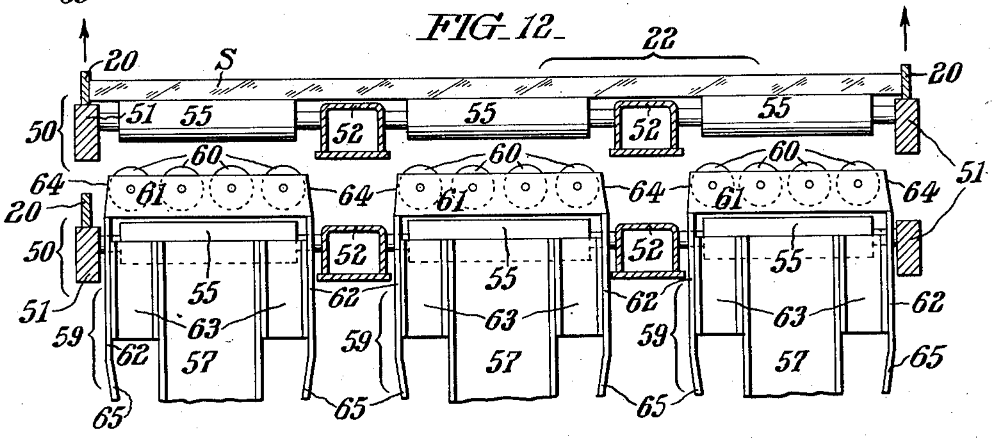
Figure 13:
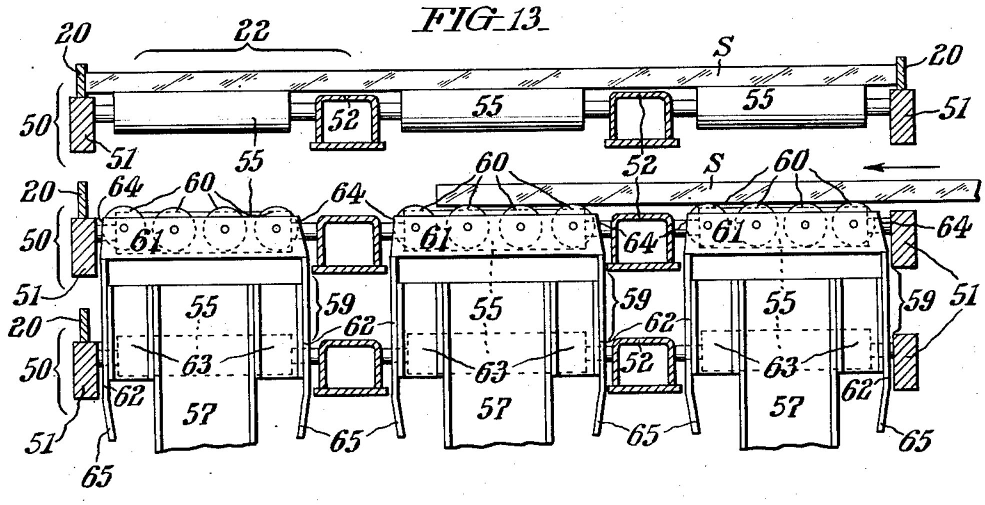

Secured to the uprights 25, 26 of the elevator 22 and vertically spaced to correspond with the spacing of the platens 2 when the press 1 is open, are grid-like shelves 50 each comprising, as best shown in Fig. 4, side bars 51 and intermediate longitudinals 52 which are rigidly joined at opposite ends by transverse bars 53 and 54. Journaled between the side and intermediate bars 51, 52 at intervals lengthwise of each shelf 50, are freely-revolving transverse-axis rollers 55 by which, in conjunction with a wider roller 56 at the distal or delivery end of the frame, the sheet trays 15 are supported in the elevator. For the purpose of temporarily sustaining each sheet tray 15 slightly above the rollers 55 as it is fed into the elevator when a shelf 50 is presented at the level of the work table 11 or 12, we have devised means including a plurality of columns 57 which rise from cross members 58 at the bottom, below frame 24. As best shown in Figs. 9 and 10, the columns 57 extend up through the elevator, and to the top of each of them is secured a holder 59 in which rollers 60 are journalled for free independent rotation, said rollers having their axes at right angles to the rollers 55. Each holder 59 includes a channel piece 61 which, at opposite ends, is supported by pendent tongues 62 welded or otherwise permanently secured to lateral projections 63 on the corresponding column 57. As shown, the upper and lower ends of the tongues 62 are inclined inwardly as at 64 and 65 for camming action with the side and intermediate longitudinals 51 and 52 of the shelves 50. The edges of the tongues 62 are beveled off at the top, as at 66 in Fig. 10, for camming action with cross pieces 67 extending between the side of the corresponding shelf and intermediate longitudinals. By virtue of this construction, resistance to free up and down movement of the elevator by the columns 57 is effectively avoided. The stop guides 20, previously referred to, are in the form of plates with outwardly curved ends, and, when in use, rest on the tops of the side longitudinals 51 of the shelves as shown in the upper part of Fig. 9. When their use is not required, the stop guides 20 are swung outwardly and downwardly out of the way about pivots 68 as shown in the lower part of Fig. 9.

Figure 14:
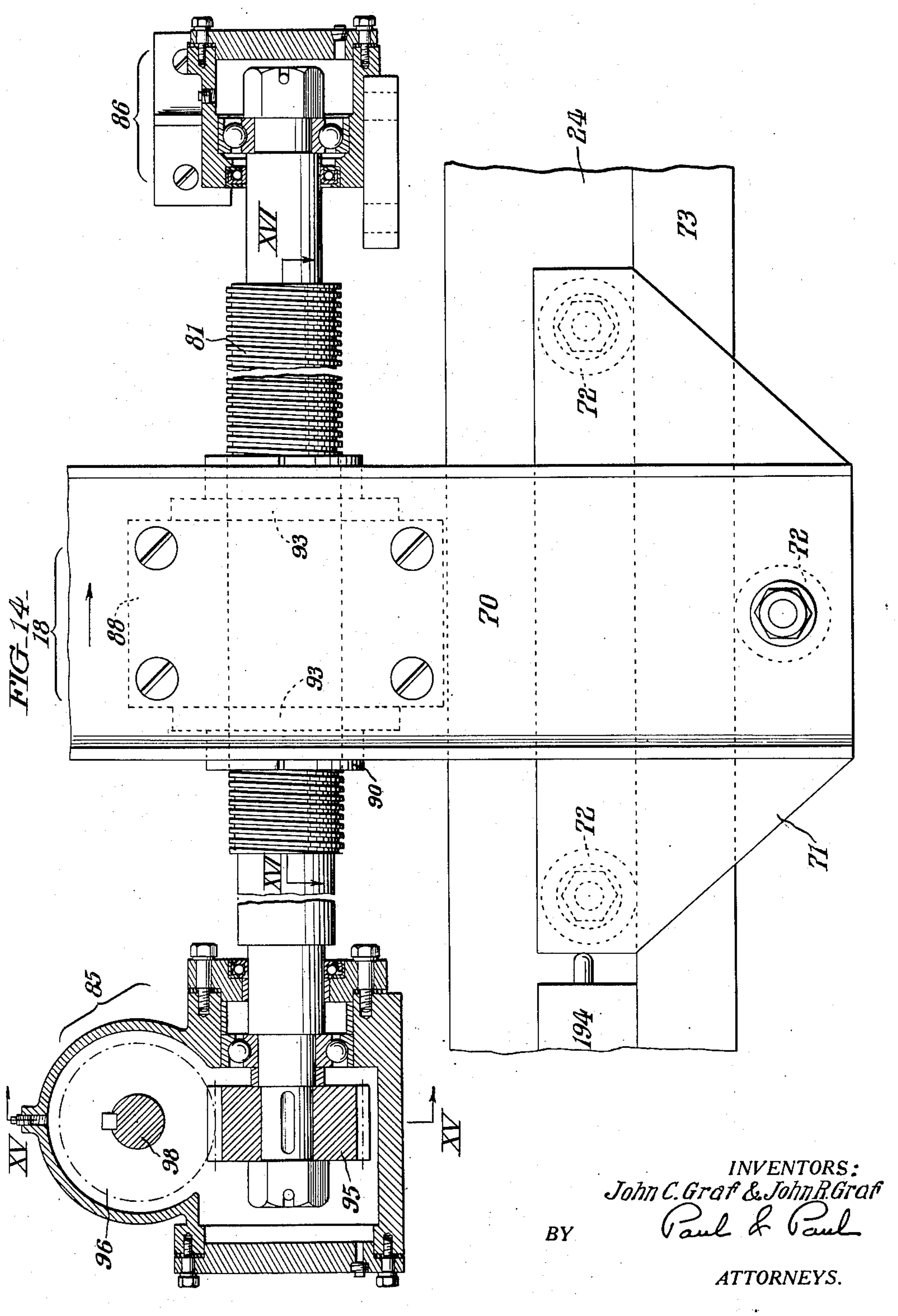
Fig. 14 is a broken out fragmentary larger scale view in elevation of the lower portion of the ejector with certain parts of its actuating mechanism shown in section.
Figure 15:
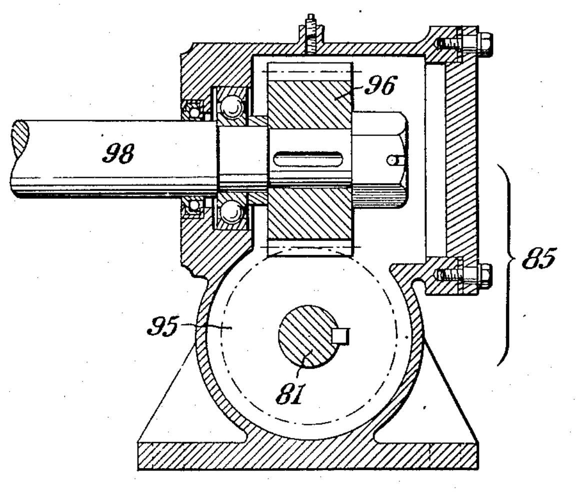
Figs. 15 and 16 are detail views in section taken as indicated respectively by the angled arrows XV—XV and XVI—XVI in Fig. 14.
Figure 16:
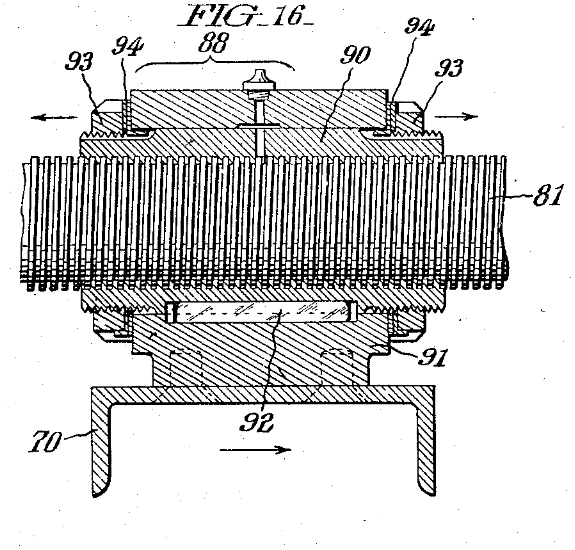
Figure 17:
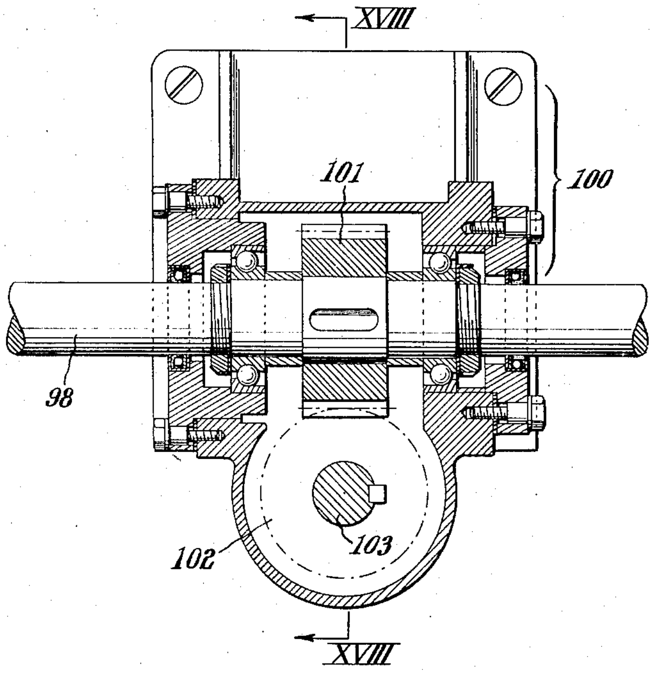
Fig. 17 is a detail view in section taken as indicated by the angled arrows XVII—XVII in Fig. 3.
Figure 18:
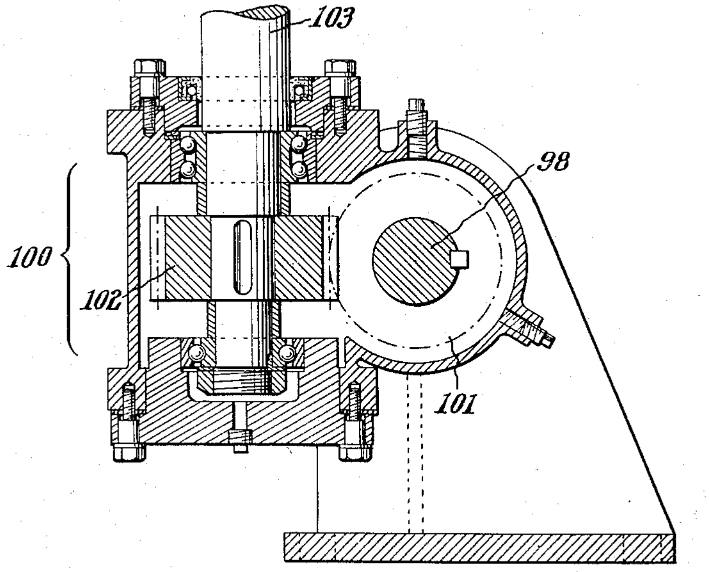
Fig. 18 is a detail view in section taken as indicated by the angled arrows XVIII—XVIII in Fig. 17.

The ejecting means 18 comprises a rectangular frame with channel section uprights 70 which, at their bottom ends, are secured to carriages 71 having rollers 72 to run on tracks 73 which extend longitudinally of the bottom frame 24 of the elevator at the outsides of the latter, see Figs. 2, 5, 6 and 8. Integrated with the channels, at their inner sides, are longitudinal webs 75 (Fig. 8) with plate facings 76, and extending crosswise between these facings are bars 77 corresponding in number to the shelves 50. As shown in Fig. 19, the bars 77 have attached bearing brackets 78 for pusher rollers 79 which are adapted to engage the edge flanges on the sheet supporting trays 15 incident to transfer of the sheets from the elevator 22 to the press 1. Extending horizontally of the elevator 22 at the top and bottom and along opposite sides are upper and lower screw spindles 80 and 81 through the medium of which the ejector 18 is moved back and forth on the tracks 73. The upper spindles 80 are respectively journalled at one end in gear housings 82 on the uprights 25 of the elevator 22, and at the other ends in bearings 83 affixed to the uprights 26 of said elevator. The lower spindles 81 are each similarly journalled at one end in gear housings 85 on the elevator uprights 25, and at their other ends in fixed bearings 86 on the uprights 26. Bolted to the channels 70 are followers 87 and 88 that co-act with the screw spindles 80 and 81 to move the ejector 18. These followers 87, 88 are all of the construction shown in Fig. 16, i. e., each of them has an internally threaded sleeve 90 which is held against rotation within the boss of a bearing bracket 91 on the corresponding channel 70, by a spline 92. The protruding ends of the sleeve 90 are threaded and engaged by nuts 93, between which and the corresponding ends of the retaining boss of the bearing bracket 91, oil sealing gaskets 94 are interposed. By backing off one of the nuts 93 and drawing up the other, the sleeve 90 can be shifted within the bearing bracket 91 in either direction. As a consequence of this adjustment, it is possible to accurately set the sleeves 90 of the several followers 87, 88 to prevent binding upon and straining of the screw spindles 80 and 81. The gear housings 83 and 85 are all of the construction shown in detail in Fig. 14, each containing a pair of spiral gears 95, 96 of which the latter are respectively keyed to aligned shafts 97, 98 horizontally of opposite ends of the elevator adjacent the top and bottom as shown in Fig. 3. As further shown in Fig. 3, the shafts 97, 98 extend through gear housings 99 and 100 respectively secured to the upper and lower frames 23, 24 of the elevator 22. Within the gear housing 100, the shaft 98 is connected by spiral gears 101, 102 (Fig. 17) to a vertical shaft 103, and within the housing 99, the shaft 97 is connected by spiral gears to a vertical shaft 107. From Figs. 2 and 4 it will be noted that the shafts 103, 107 extend into a speed reduction unit 108, which, together with an electric drive motor 109 therefor, are mounted on a bracket 110 supported by the elevator. A rotary cut-out switch of a well known commercial type indicated at 111 is driven by a belt 112 through a regulatable torque coupling 113 (also of a well known type) between the motor 109 and the gear reducing unit 108. If the loading of the elevator 22 should exceed that capable of being displaced by the ejector 18, slippage will take place in the coupling 113 to operate the switch 111 and thereby cause interruption of current to the motor 109. In this way the ejecting means is protected against the possibility of jamming or injury under the condition noted.

Pivoted to the bottom frame 24 of the elevator at corners are detents 115, 116 which are adapted to cooperate with fixed ratchet-toothed vertical rack bars 117, 118 at opposite sides of the pit 7. For actuation of each pair of the detents 115, 116 a pneumatic cylinder 119 is provided, the same being bolted to the corresponding side of the lower frame of the elevator, see Figs. 5 and 6. The interposed motion translating means include, in each instance, rock shafts 120, 121 with levers 122, 123 coupled, by means of links 125, 126, with arms 127, 128 on the pivots 129, 130 of the detents 115, 116. As shown, a link rod 131 connects the lever 122 with an upwardly extending arm 132 of lever 123, while an upwardly extending arm 133 on rock shaft 120 is coupled, by a link rod 134, with the piston rod 135. A spring, designated 136 and influential upon the arm 133, acts upon the linkage arrangement to yieldingly urge the detents 115 toward the rack bars 117. Piping 137 (Figs. 5 and 7) connects the cylinders 119 with a slide valve 138 to which compressed air is conducted from the supply source (not shown) through a pipe 139.

Affixed to one of the corner uprights 26 of the elevator, as shown in Fig. 2, is a vertically reading scale 140 with graduations spaced to correspond with the successive stop positions of the loading elevator; and supported by a post 141 rising from the floor 6 adjacent the press 1 is a pointer 142 for coordination with said scale.

*Unloading unit*

Except for the lack of an ejecting means, the unloading unit 10 of the same construction as the loading unit 9 in that it comprises an elevator 145 with rectangular upper and lower frames 146 and 147 connected by corner uprights 148 and 149. The elevator 145 is raised and lowered by means of hydraulic rams 150 to which actuating fluid pressure is conducted, and from which it is exhausted through piping 151 under control of means similar to that described in connection with the loading unit 9. The elevator 145 is here likewise stabilized by dash pot cylinders 152, whereof the plungers 153 are connected by a cable 155 trained about guide wheels 156. The shelves 160 of the unloading elevator 145 are identical with those of the loading elevator 22, and provided with supporting rollers 161 for the sheet trays 15. Here also, transverse-axis rollers 162 at the tops of columns 163 serve to temporarily sustain the trays 15 above the rollers 161 and thereby facilitate removal of the latter as the shelves are successively presented at the level of the work table 13 or 14 during stepwise lowering of the unloading elevator. It will also be noted that detents 165 are here provided to cooperate with fixed upright toothed racks 166 at opposite sides of the pit, said detents being retractable by linkage means 167 similar to those previously described and arranged to be actuated by air cylinders 168 whereto motive fluid is conducted by way of piping 169 under control of a valve (not shown) similar to the valve 138. In being transferred from the press to the unloading elevator 10 as hereinbefore pointed out, the sheet trays 15 are arrested by the rollers 19 of which there is an upstanding group arranged at the far end of each shelf 160.

*Control means*

Figure 20:
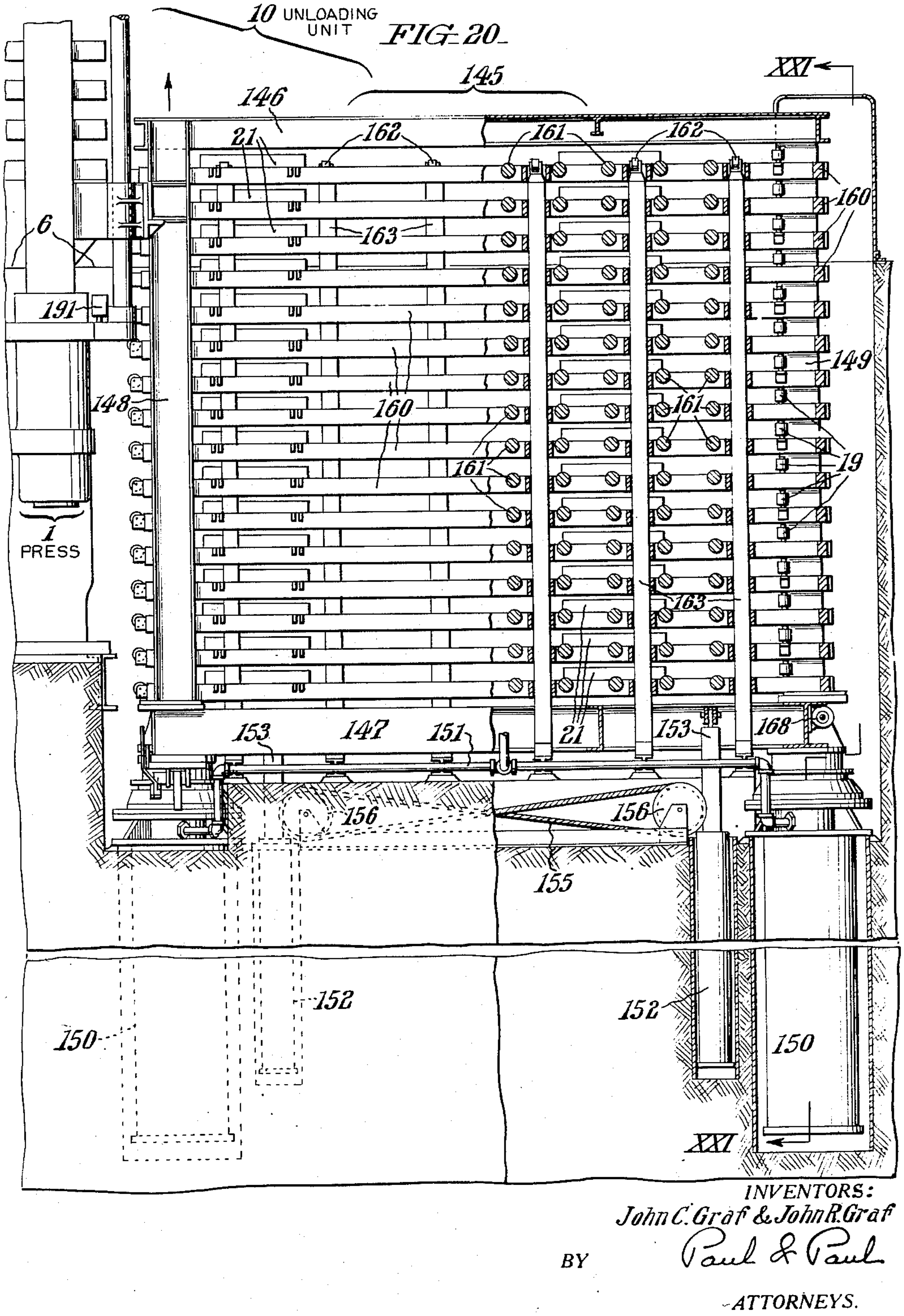
Fig. 20 shows the elevation of one side of the unloading unit with portions broken away and in section to better illustrate important structural details, with the elevator of the unit fully lowered.
Figure 21:
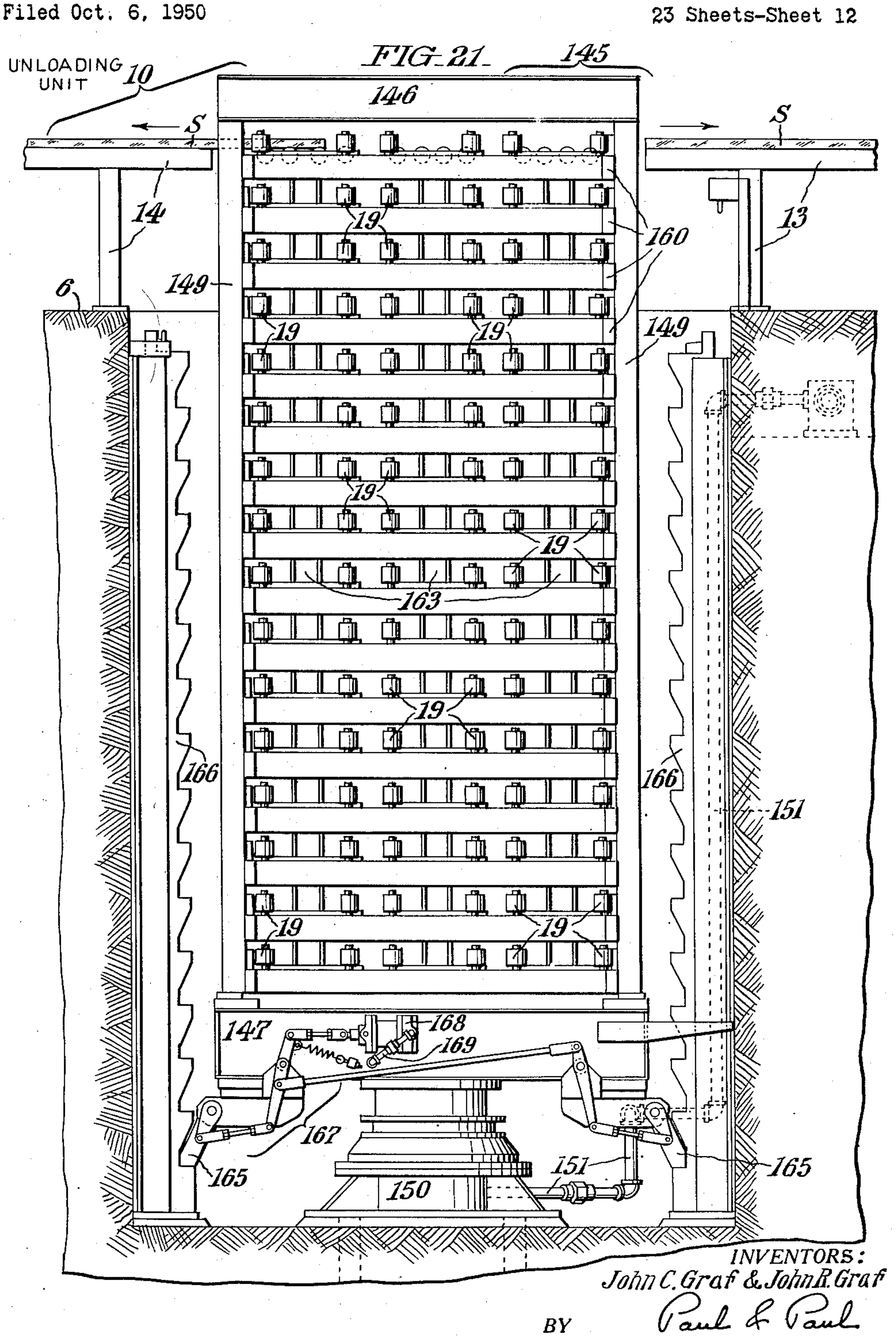
Fig. 21 is a view looking as indicated by the angled arrows XXI—XXI in Fig. 20 and showing the unloading unit in end elevation.
Figure 22:
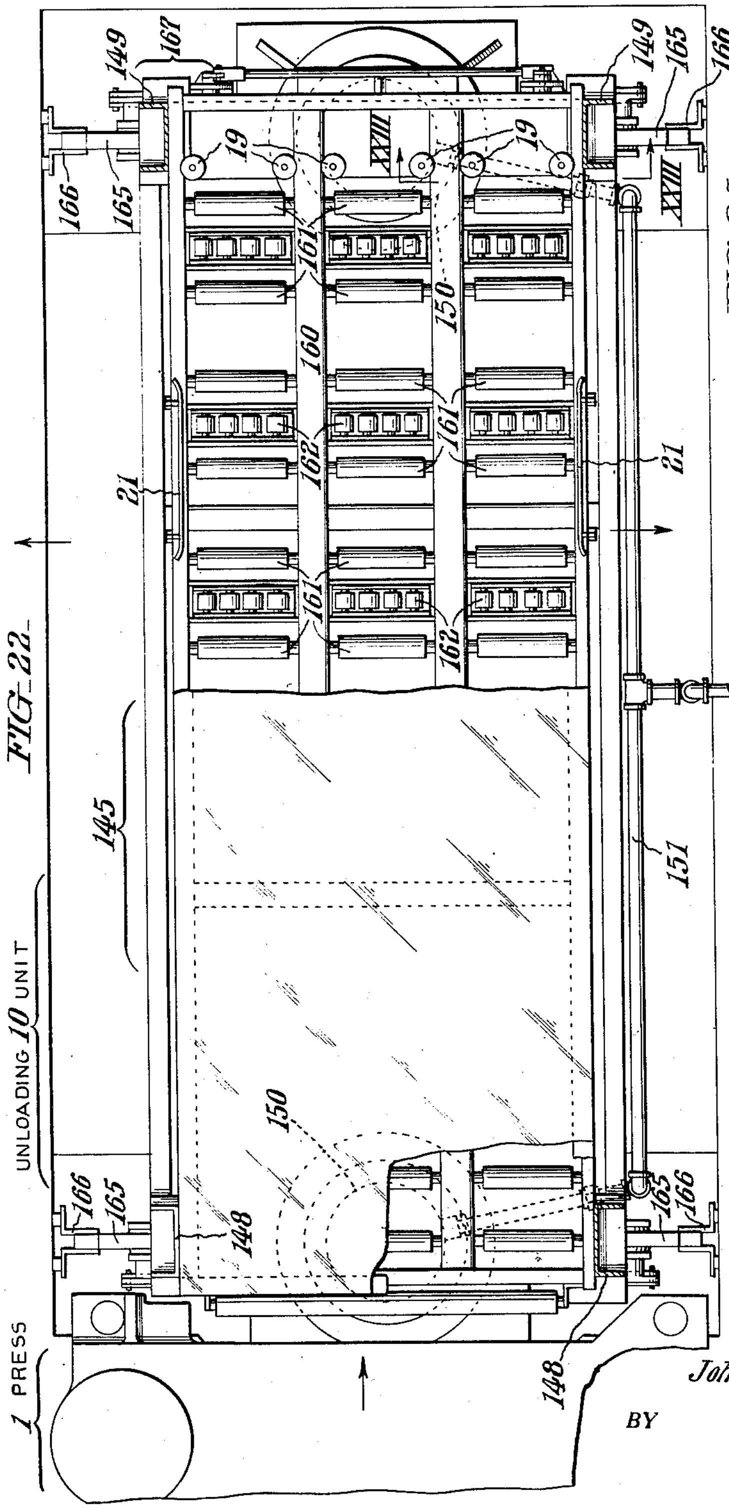
Fig. 22 shows the unloading unit in top plan, with the roof plate of its elevator broken away to expose the parts beneath.
Figure 24:
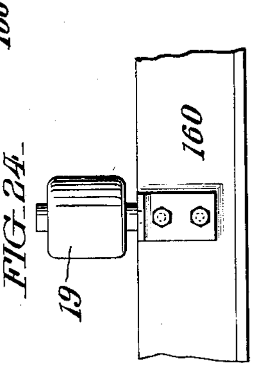
Fig. 24 is a fragmentary detail view in elevation looking as indicated by the angled arrows XXIV—XXIV in Fig. 23.
Figure 23:
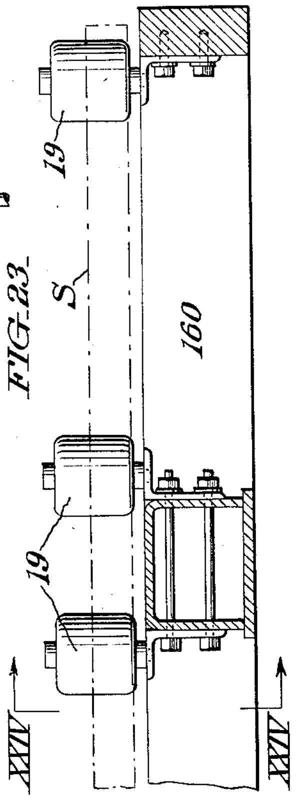
Fig. 23 is a fragmentary view in section taken as indicated by the angled arrows XXIII—XXIII in Fig. 22.
Figure 25:
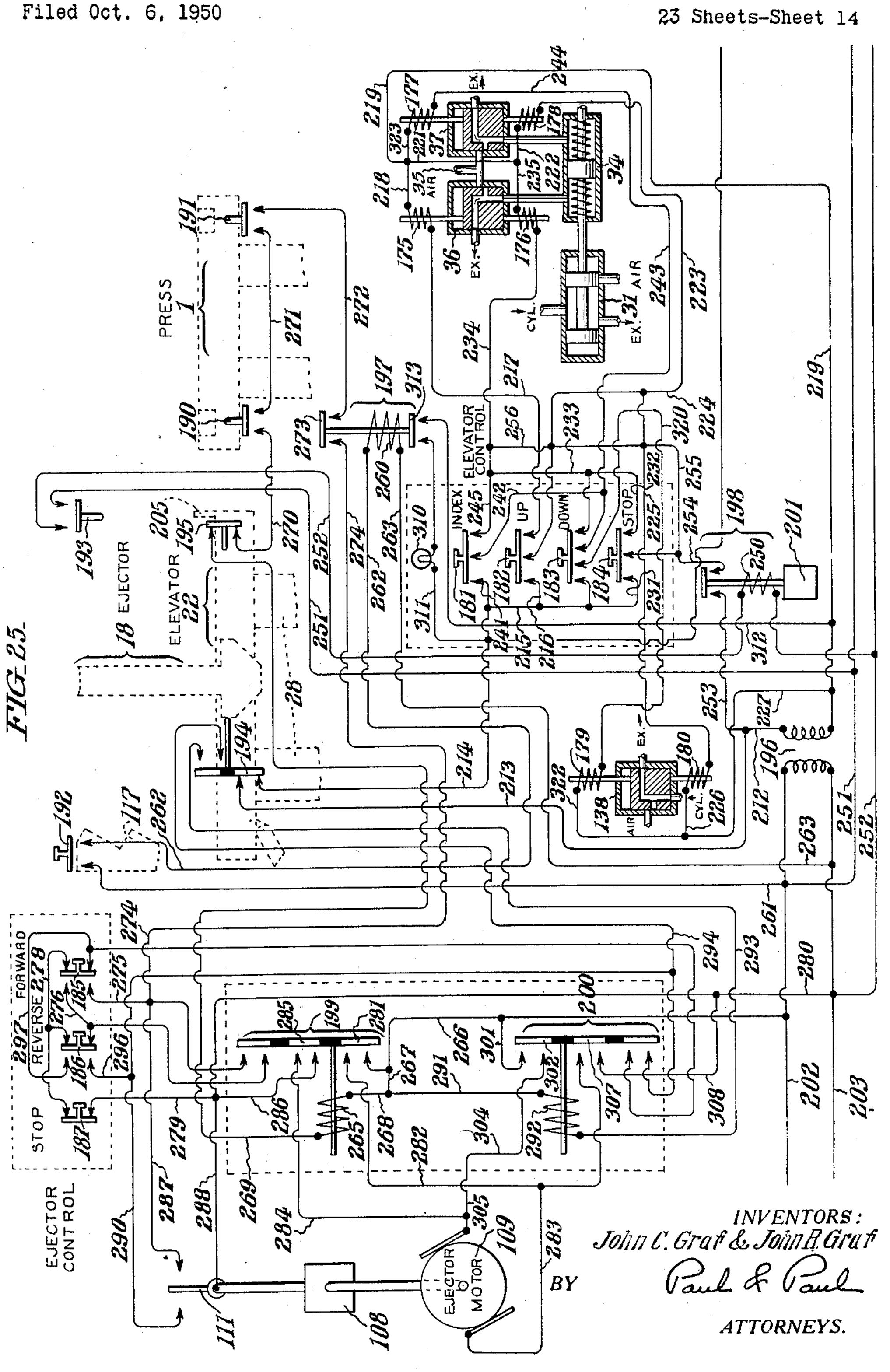
Fig. 25 is a diagrammatic view of an electrically powered system which we have devised for controlling the operation of the loading elevator and the ejecting means.

For the purpose of controlling the operation of the elevator 22 of the loading unit 9 and the ejector, we utilize a number of electrical instrumentalities all of which are interposed in the wiring system diagrammatically illustrated in Fig. 25. As there shown, these instrumentalities include solenoids 175, 176 and 177, 178 for respectively actuating the pilot valves 36 and 37 associated with the cylinder 34 for shifting the master valve 31 by which fluid pressure is admitted and exhausted from the lift rams 28 of the loading elevator 22; solenoids 179, 180 for actuating the valve 138 by which compressed air is admitted to the detent operating cylinders 119 of the loading elevator; "Index," "Up," "Down" and "Stop" push buttons 181, 182, 183 and 184, all of the momentary contact type for controlling the operation of the loading elevator; similar "Forward," "Reverse" and "Stop" push buttons for controlling the ejector 18; drop limit switches 190, 191 for actuation by the press 1; limit switches 192, 193 for actuation by the loading elevator; limit switches 194, 195 for actuation by the ejector; a transformer 196; relays 197, 198, 199, 200; and a timer device 201. Electric current for the entire system is supplied from A. C. power mains indicated at 202 and 203. The limit switches 190, 191, see Figs. 2 and 20, are carried by the movable head of the press 1, and are actuated upon engagement of their operating projections with the floor 6. The limit switch 192 (Figs. 3 and 6) is supported at the top of one of the rack bars 117 for actuation by the corresponding detent 115, and the limit switch 193 is secured to one of the slide bearings at the top of the loading elevator 22 for actuation by a stop projection 205 on the lower cross member of the said elevator. The limit switches 194 and 195 (see Fig. 2) are likewise secured to the lower cross member of the loading elevator 22 and adapted to be actuated respectively upon engagement of their operating projections by one of the carriages of the ejector 18 as the latter reaches the ends of its forward and return travel. The location of the push button switches 181—184 and 185—187 on the apparatus is not shown, but it is to be understood that they are placed so as to be convenient of access to an attendant stationed near the loading tables on the platform 6. It is also to be understood that a similar electric system with "Index," "Up," "Down" and "Stop" buttons is provided for, controlling the raising and lowering of the elevator 145 of the unloading unit 10.

*Operation*

Figure 26:
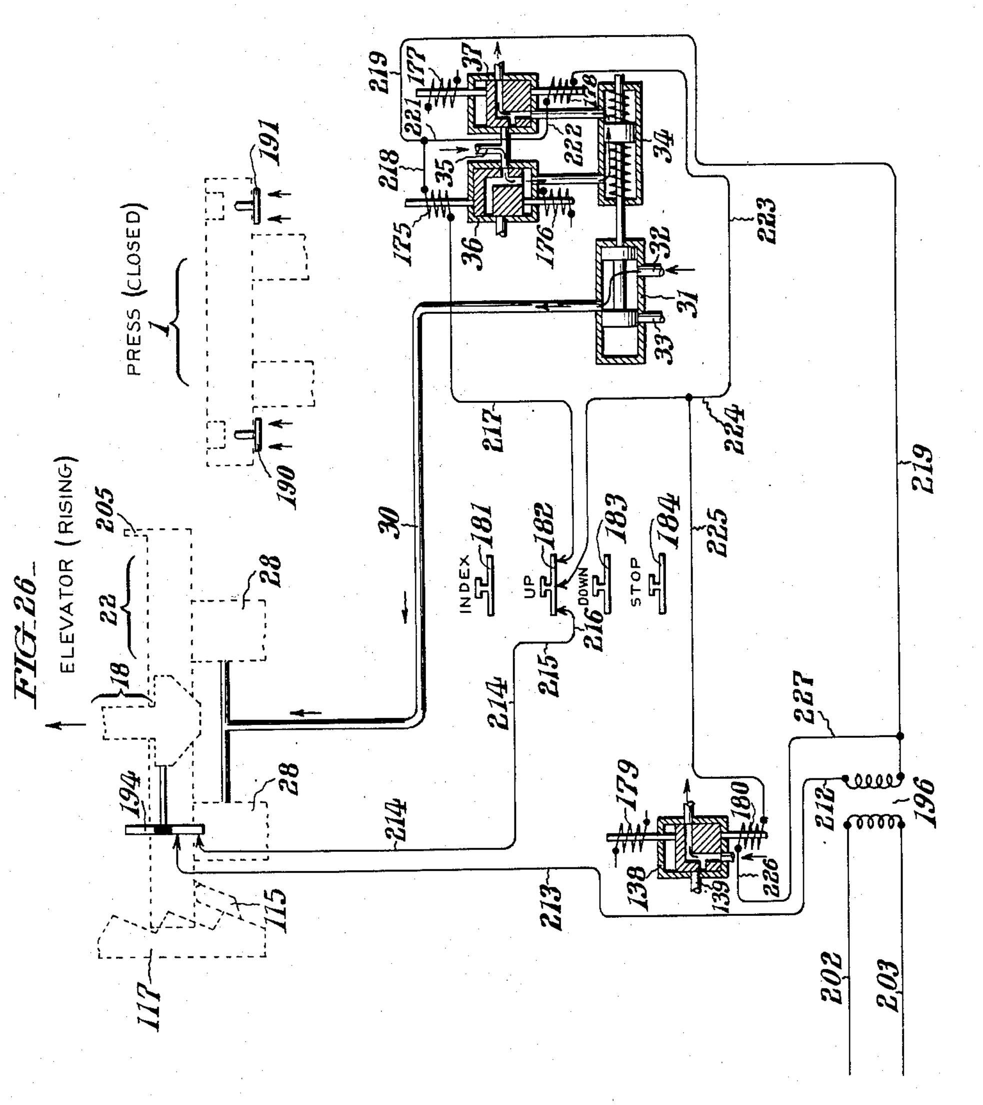
Figs. 26–32 are views generally like Fig. 25 showing successive stages in the operation of the apparatus.
Figure 27:
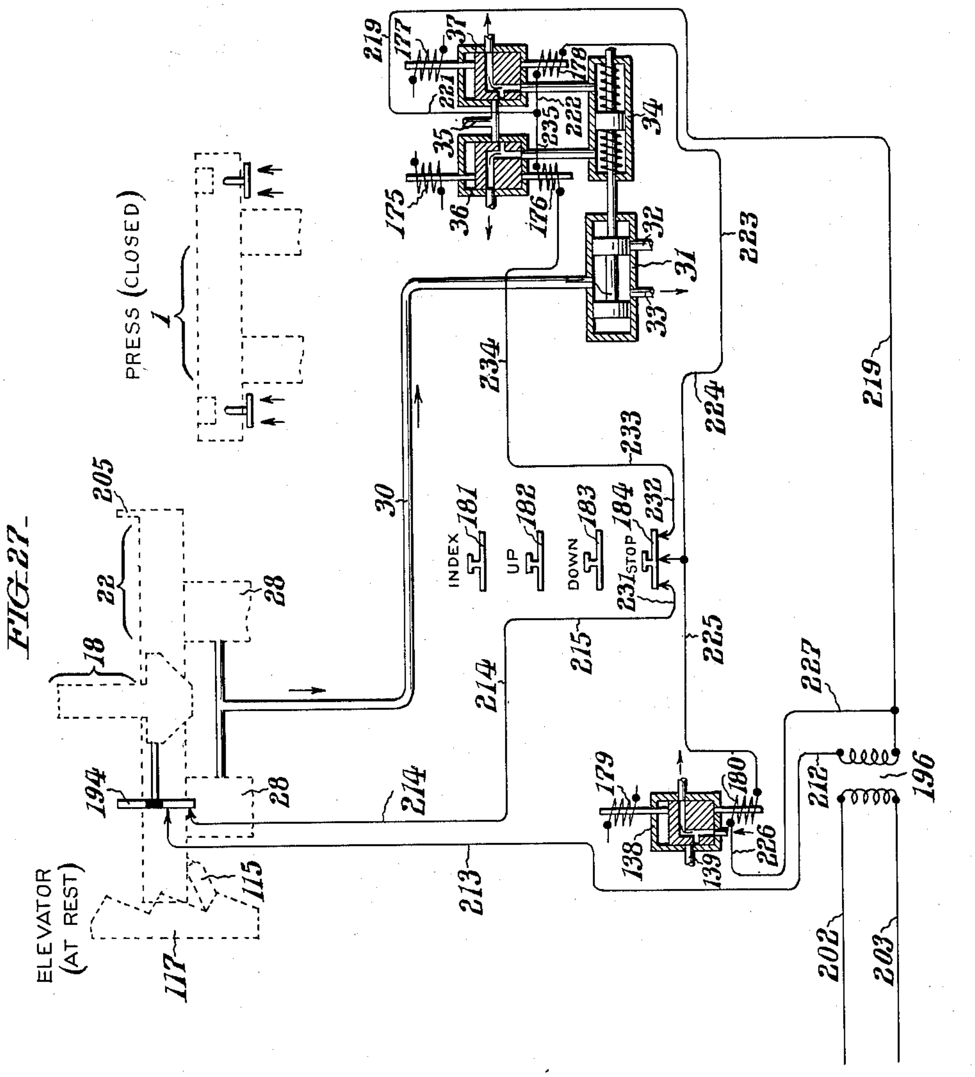

Assume the elevator 145 of the unloading unit 10 to be fully raised, the press 1 to be closed, and the elevator 22 of loading unit 9 to be all the way down, as in Figs. 2 and 3, with its uppermost shelf 50 at the level of the charging table 11, a tray 15 filled with sheets S is pushed edgewise from said table onto the rollers 60 at the tops of the columns 57 for temporary support by the latter slightly above the rollers 55 of said shelf, until arrested by the stops 17 and 20. The "Up" button 182 is then pressed, as in Fig. 26, for energization of the actuating solenoid 175 of the pilot valve 36 by current flow from the secondary coil of transformer 196, conductors 212, 213, one side of close limit switch 194, conductors 214, 215, 216, 217, 218 and 219. The piston of pilot valve 36 is thereby shifted for admission of compressed air into the left hand end of actuating cylinder 34, whereby the piston of the latter is shifted rightward from its normal neutral position, carrying with it the piston of master valve 31, as also shown, for flow of compressed air by way of pipe 30 to the rams 28 of the loading elevator 22 which thereupon starts to rise. At this time the solenoid 178 of pilot valve 37 and the solenoid 180 of valve 138 will be energized to hold said valves against the accidental displacement from the positions in which they are shown in Fig. 26, by current flow through a circuit including conductors 221, 222, 223, 224, 225, 226 and 227. When the loading elevator 22 has been raised to bring its next shelf 50 to the level of charging table 11, the "Stop" button 184 is pressed. As a consequence, the solenoid coil 176 of pilot valve 36 will be energized as in Fig. 27 by current flow from the secondary of transformer 196 through conductor 213, one side of closed limit switch 194, conductors 214, 215, 231, 232, 233, 234, 235, 221 and 219. The pilot valve 36 is thereby moved back to its original position, allowing exhaust to take place from the left hand end of the cylinder 34 to shift the piston of master valve 31 rightward for exhausting of the rams 28. The loading elevator 22 will then settle until the detents 115 bear upon the lowermost teeth of the racks 117 after having simply slid over said teeth during the rise of said elevator. A second tray of fresh sheets S is then slid from the charging table 11 onto the temporary supporting rollers 60 at the tops of column 57 which rollers will then be slightly above the level of the rollers 55 of the newly presented shelf 50 of the loading elevator. During the last described stage in the operation, the valves 37 and 138 are again held against accidental displacement from the positions in which they are shown in Fig. 27 by energization of the solenoids 178 and 180 through current flow in a secondary circuit 221, 222, 223, 224, 225, 226 and 227. This procedure is repeated over and over again until the loading elevator 22 is raised with its bottom shelf in registry with the charging table 11 for placement of a last tray thereon. The scale 140 and pointer 142 are of course used by the operator as guide means in stopping the elevator 22 at the successive levels during the loading.

Figure 28:
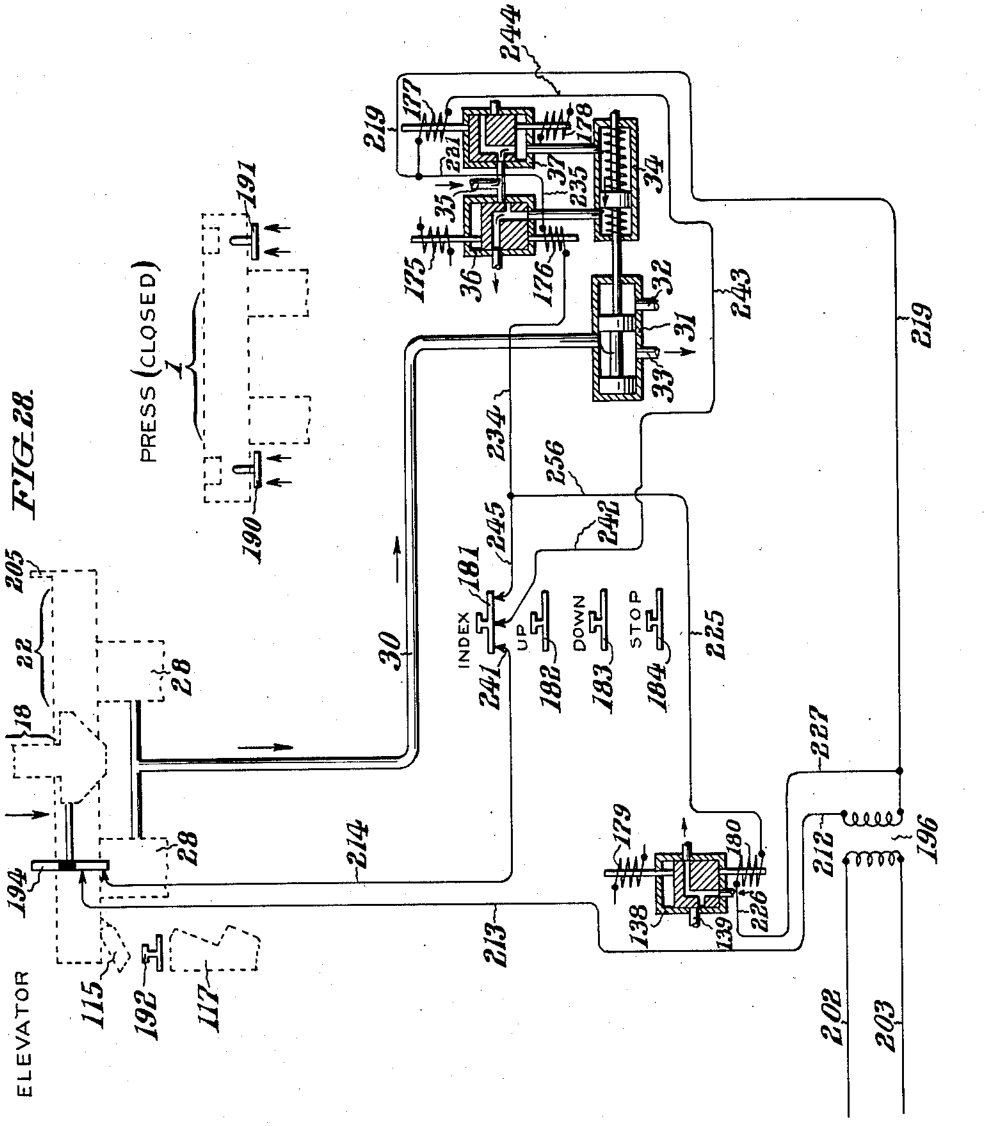
Figure 30:
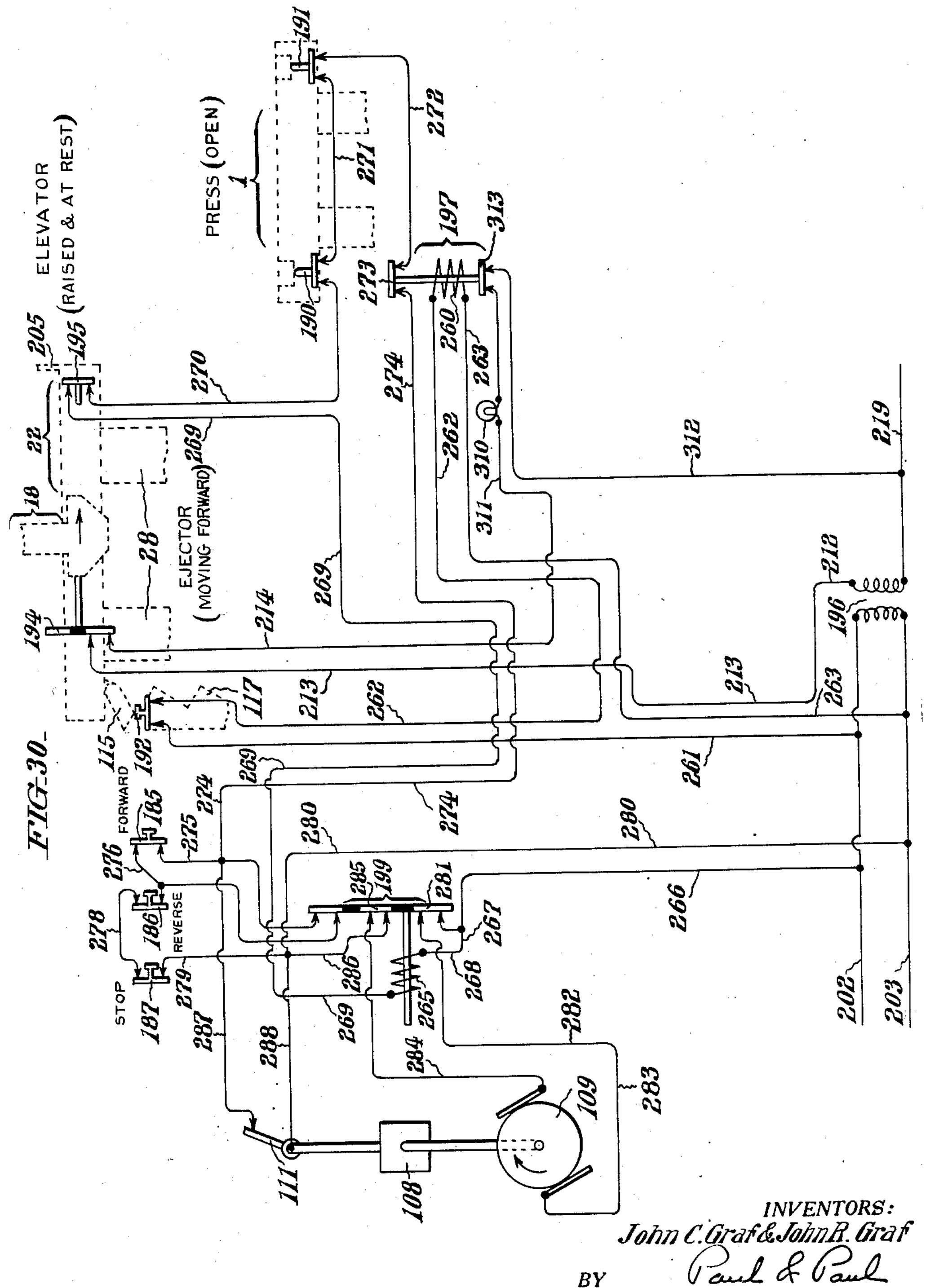

When the elevator is eventually filled, the tray 15 inserted onto the lowermost shelf will rest on the temporary supporting rollers 60 somewhat above the rollers 55. It is therefore necessary to raise the elevator another step to bring it to "indexing" position. This is effected by pressing the "Up" button once more whereby the elevator is lifted to a distance sufficient for the detent 115 to clear the switch 192. The "Index" button is pushed, for energization of the solenoid 177 to set the pilot valve 36 in the position in which it is shown on Fig. 28, by current flow from the secondary of transformer 196 through conductors 212, 213, one side of closed limit switch 194 conductors 214, 241, 242, 243, 244 and 219. Accordingly compressed air is admitted into the right hand end of cylinder 34 for shifting of the master valve 31 to the left as shown, whereby the rams 28 are permitted to exhaust through the piping 30, so that the elevator 22 will settle, with incidental closing of the switch 192 by one of the detents 115, which latter will come to rest on the very tops of the rack bars 117 as in Figs. 6 and 30. Here the pilot valve 37 and the valve 138 will be held against accidental displacement by energization of the solenoids 176 and 180 as a consequence of current flow in conductors 245, 234, 235, 221, 219, 245, 254, 225, 226 and 227. Actuation of switch 192 as just described will result in the energization of the coil 260 of relay 197 to close the latter, by current flow from the main 202 through conductors 261, 262, 263 to the main 203 as also shown in Fig. 30, and thereby lock in the ejector control circuit as will presently be seen. It is to be particularly observed that pressing of the index button is attended by lowering of the elevator 22 without retraction of the detents 115.

Figure 29:
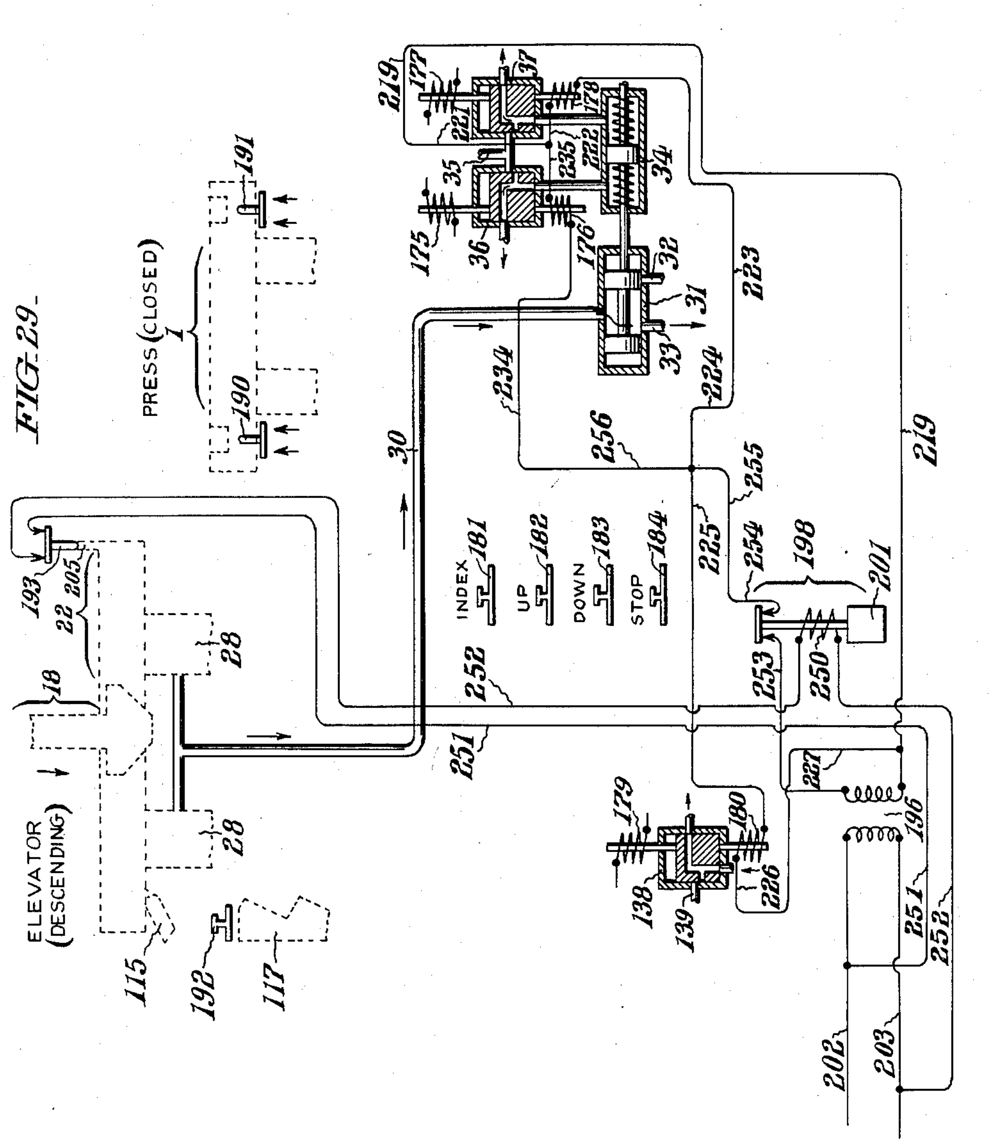

In the event that, during indexing, the operator should fail to press the "Stop" 184 button in time to arrest the loading elevator 22 and the latter should rise beyond the extent necessary, the limit switch 193 will be closed automatically as in Fig. 29, with consequent actuation of the timer 198 through energization of the solenoid 250 of the latter by current flow from mains 202, 203 through conductors 251, 252 in which said switch and said solenoid are interposed. When this happens, a circuit is established through conductors 253, the switch of timer 198, conductors 254, 255, 256, 234, solenoid 176 of pilot valve 36, conductors 235, 221 and 219 and also through conductor 222, solenoid 178 of pilot valve 37, conductors 223, 224, 225, solenoid 180 of valve 138, conductors 226, 227 and secondary coil of transformer 196, to position said pilot valves 36, 37 and said valve 138 as shown in Fig. 29. Under these circumstances, the rams 28 will exhaust to allow the loading elevator to settle until the detents 115 rest on the top of the racks 117 as before, the timer 198 being designed to open automatically after lapse of the relatively short period required for the elevator to drop to the extent required to bring it to indexing position.

Figure 31:
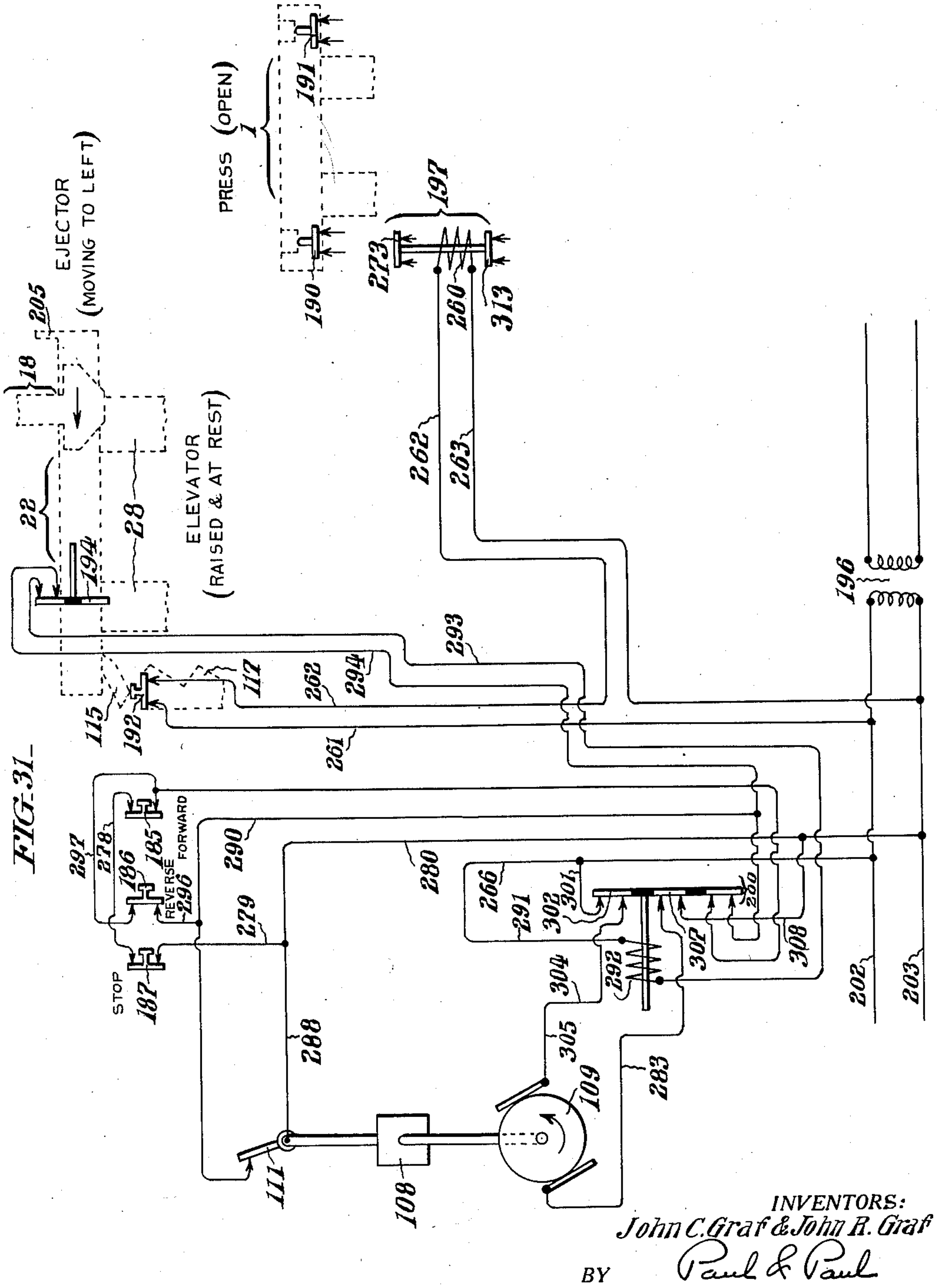

All being now ready for transfer of the trays 15, the press 1 is opened, with incidental closing of the limit switches 190 and 191 as its descending head comes to rest as in Fig. 30. The "Forward" button 185 is thereupon pressed as in Fig. 30, for energization of the coil 265 of relay 199, and starting of motor 109 through establishment of a circuit from the main 202 through conductors 266, 267, 268, 269, switch 195, conductor 270, switch 190, conductor 271, limit switch 191, conductor 272, switch 273 of relay 197, conductors 274, 275, 276, reverse switch 186, conductor 278, closed stop switch 187, and conductors 279 and 280 to the main 203. As relay 199 closes, current will flow from the main 202 by way of the conductors 266, plate 281 of relay 199 and conductors 282, 283 to motor 109, and from thence through conductor 284, plate 285 of relay 199, and conductors 286 and 280 to main 203. As the motor 109 starts, the protective switch 111 will be moved to the position of Fig. 30 and the motor 109 kept running after push button 185 is released, through establishment of a connection between extensions 287 and 288 respectively of conductors 274 and 280. If for any reason the motor 109 should become overloaded and drop in speed below a predetermined point, the switch 111 will automatically open the motor circuit as will be readily understood. As the motor 109 runs, motion is transmitted to the mechanism hereinbefore described, for actuating the ejector 18 which is thereby moved rightward (as considered in Fig. 2) to push all of the trays 15 from the loading elevator 22 into the open press with simultaneous displacement of the previously pressed trays from said press into the raised unloading elevator. In its advance, the ejector 18 eventually engages and opens the limit switch 195 whereby the circuits, set up as described in connection with Fig. 30, are automatically broken to stop the motor 109. After transfer of the trays 15 is consummated, the "Reverse" button 186 is pushed as in Fig. 31 for return of the ejector 18 to its normal retracted position, by reverse drive of the motor 109. In this stage of control, current will flow from the main 202 through conductors 266, 291, coil 292 of relay 200 to close the latter, and from thence through conductor 293, one side of switch 194, conductors 294, 290, 296, switch 186, 297, switch 185, conductor 278, switch 187, and conductors 279, 280 to main 203. By closing of relay 200, a circuit will be established through the motor 109 to reversely drive it, through conductors 266, 301, plate 302 of relay 200, conductors 304, 305, motor 109, conductor 283, plate 307 of said relay, and conductors 308, 280. Since limit switch 192 is still closed, the coil of relay 197 will remain energized as shown in Fig. 31 by current flow through conductors 261, 262, 263. During indexing for actuation of the ejector 18, a pilot lamp 310 (Fig. 30) will be lighted to signal the operator, through current flow in a branch circuit 311, 312 of the low voltage line under control of the switch plate 313 of relay 197. If it should be necessary for any reason to stop the ejector 18 at any point in its travel in either direction, the "Stop" button 187 is pushed, whereby the circuit through the motor 109 is interrupted in a manner readily understood from the diagrams.

Figure 32:
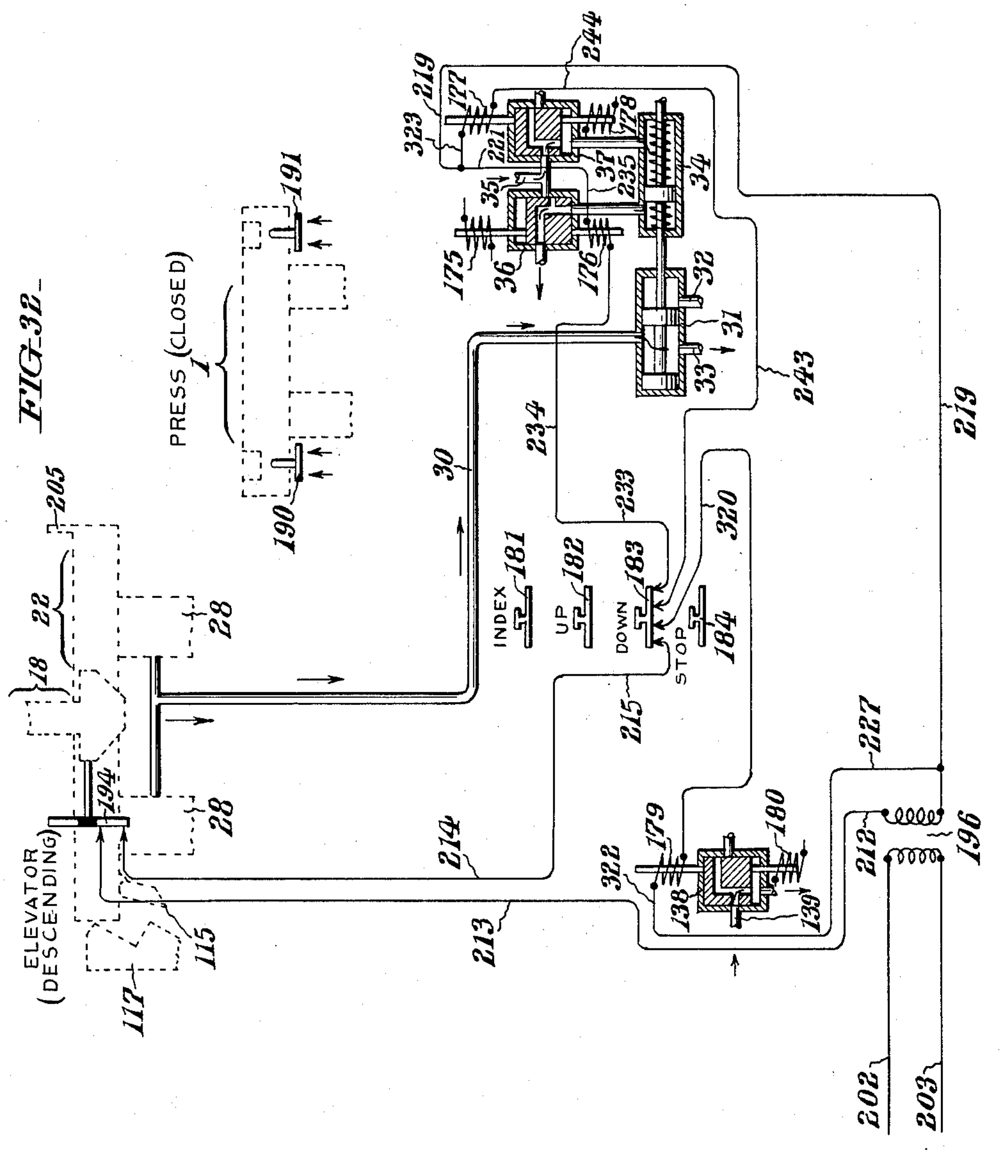
Figures 33, 34:
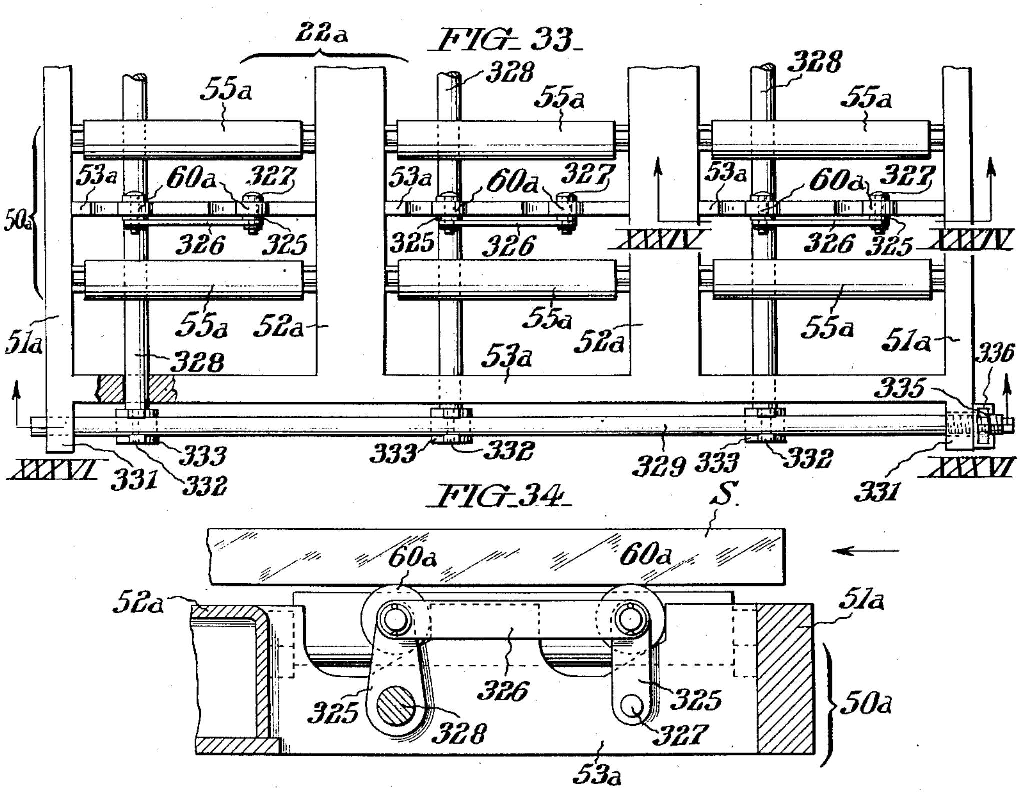
Fig. 33 is a fragmentary view in top plan corresponding to Fig. 4 drawn to a larger scale and showing a modified elevator construction.
Fig. 34 is a fragmentary view in section taken as indicated by the angled arrows XXXIV—XXXIV in Fig. 33.

As the ejector 18 recedes, it eventually closes the limit switch 194, whereupon the ejector control circuits resume the normal condition of Fig. 25. The empty loading elevator 22 is then lowered to the original position of Fig. 2. This phase of the operation is carried out as follows: The "Up" button 182 is first pushed to cause the elevator to be raised slightly for easement of the detents 115 and then stopped by pushing the "Stop" button 184, whereupon the "Down" button 183 is pushed as in Fig. 32 for current flow from the secondary of transformer 196 through conductors 212, 213, one side of switch 194, conductors 214, 215, 320, solenoid 179 of valve 138, and conductors 322, 227, whereby the valve 138 is shifted to the position of Fig. 32 with the result that compressed air is permitted to flow to the cylinder 119 for withdrawal of the detents 115 from the racks 117. At the same time, the solenoids 176 and 177 will be energized to shift the pilot valves 36, 37 to the positions of Fig. 32 by current flow through conductors 233, 234, 235, 221, and through conductors 243, 244, 323 en route from the switch 183 to a point of juncture with the conductor 219. With the pilot valves 36, 37 positioned as just described, the master valve 31 will be shifted to the left, as in Fig. 32, for exhausting of the rams 28 so that the elevator 22 may descend, the detents 115 being held retracted from the racks 117 during this interval. When the elevator 22 has reached the bottom of its travel, it is stopped by pushing the "Stop" button 184 in readiness for re-charging, the press 1 having been closed in the meantime to compress the new batch of sheets placed therein.

It is to be particularly noted that the interconnection of the various circuits involved in the control system is such that the ejector 18 cannot be operated while the press 1 is closed or until the elevator 22 has been indexed due to the provision of the automatically actuated limit switches 190, 190 and the switch 192; and moreover that the elevator 22 cannot be raised or lowered during the operation of said ejector due to the provision of the automatically-actuated limit switches 194, 195. The apparatus is thus insured against possible damage which could be serious if such safeguarding were to be left to the skill or judgment of the operator.

The unloading of the elevator 105 of unit 10 is accomplished, by lowering it stepwise in precisely the same manner as above described in connection with the loading elevator 22, by the similar control means (not illustrated) hereinbefore mentioned, provided for it, and the trays 15 with the pressed sheets are withdrawn from it as the shelves thereof are successively presented at the receiving table 13 (or 14), while said loading elevator is being recharged. When finally emptied, the unloading elevator 105 is raised in readiness to again receive another batch of trays with pressed sheets from the press 1.

*Modified elevator construction*

Figure 35:
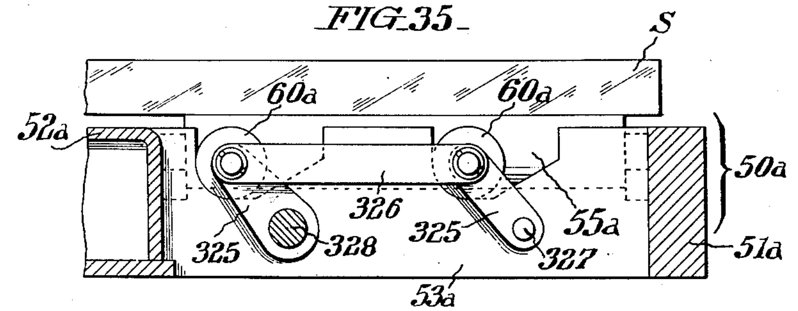
Fig. 35 is a view like Fig. 34 with the movable parts differently positioned.
Figure 36:
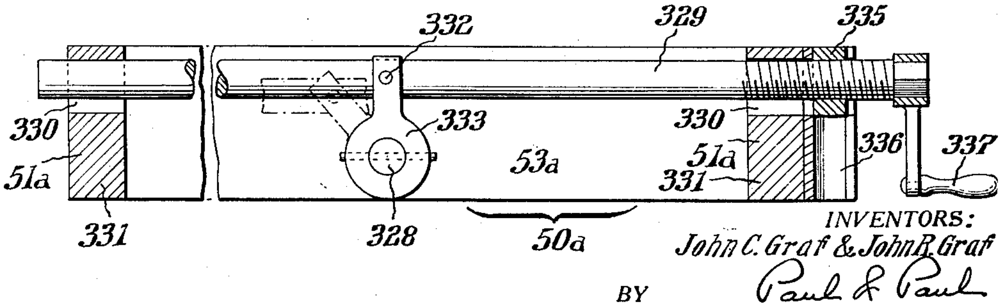
Fig. 36 is a broken out fragmentary view in section taken as indicated by the angled arrows XXXVI—XXXVI in Fig. 33.

In the modification illustrated in Figs. 33–36, the rollers 60*a* for temporarily supporting the sheets or slabs above the rollers 55*a* on the shelves 50*a* of the elevator 22*a*, are individually carried by arms 325 which are connected in pairs by horizontal links 326. One arm 325 of each pair is fulcrumed on a stud 327 engaged in a cross member of the grid medially of the interval between adjacent rollers 55*a*, and the other arm of each pair is fixed to a shaft 328. As shown, the shafts 328 extend longitudinally of the shelf 50*a* and are rotatively supported in the end and cross members 53*a*. Extending along one of the end members 53*a* of the shelf at the outside, is a shaft 329 which passes through vertical guide slots 330 in end projections 331 of the side members 51*a* of the shelf, said shaft being connected by pins 332 to short levers 333 on the respective shafts. The shaft 329 is in threaded engagement adjacent one end thereof with a slide block 335 constrained to up and down movement in a guide 336 on the shelf, and said end is squared for application thereto of a crank handle 337. Normally the rollers **60*a* are positioned as in Fig. 34 to support the sheets or slabs S somewhat above the rollers 55*a*. By turning the crank handle 337 the shaft 329 is rotated in the block 335 and at the same time moved endwise to the left in Fig. 36 and downward of the slots 330 in the side members 51*a* of the grid 50*a*, as indicated in broken lines. As a consequence, the shafts 328 are partially rotated anti-clockwise and the rollers 60*a* lowered as shown in Fig. 35 into notches in the cross members of the grid 50*a* for repose of the sheet or slab S upon the rollers 55*a*** after it has been fully advanced onto the elevator. It is to be understood that the modified arrangement just described is duplicated on each grid of the two elevators.

*Alternative ejector construction*

Figures 37, 38, 39:
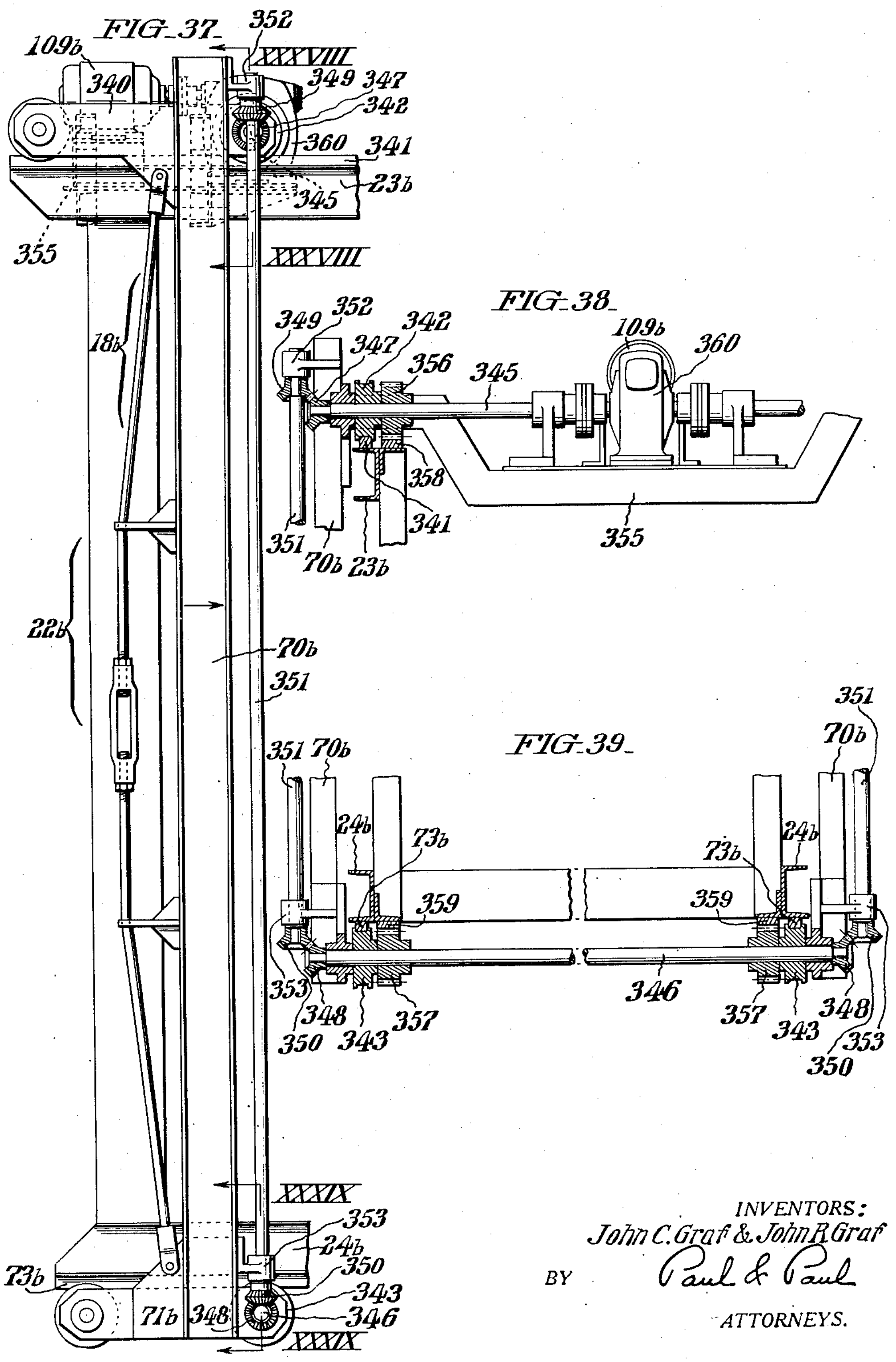
Fig. 37 is a fragmentary view in side elevation of a modified ejector construction.
Figs. 38, 39 are fragmentary detail sectional views taken as indicated respectively by the angled arrows XXXVIII—XXXVIII and XXXIX—XXXIX in Fig. 37.

In the alternative embodiment of our invention illustrated in Figs. 37–39, the ejecting mechanism is provided top and bottom at both sides with carriages which are rigidly connected to the uprights **70*b*, the wheels of these carriages 340 and 71*b* engaging vertically spaced horizontal tracks 341 and 73*b* on the upper and lower frame longitudinals 23*b*, 24*b* of the elevator 22*b*. Corresponding wheels 342 and 343 of the upper and lower carriages 340 and 71*b* respectively at opposite sides of the structure are connected to cross shafts 345 and 346 with miter gear pinions 347 and 348 thereon in mesh with mating miter pinions 349 and 350 on vertical shafts 351 journaled in bearing brackets 352 and 353 on the uprights 70*b*. Also secured to the shafts 345 and 346 are spur pinions 356 and 357 (Figs. 38 and 39) which mesh with horizontal racks 358 and 359 on the upper and lower frame longitudinals 23*b* and 24*b*. Mounted on the transverse frame member 355 at the top of the elevator is a reversible electric motor 109*b* which, through a speed reducer 360, is adapted to communicate rotary motion to the shaft 345. By virtue of this transmission arrangement, it will be seen that the wheel shafts 345 of the upper and lower carriages 340 and 71*b* are driven in unison as a result of which the ejector is horizontally advanced and retracted on the elevator by forward and reverse rotation of the motor 109*b* without any tendency of the ejector to bind on its guide tracks 341 and 73*b***.

Our invention is of course not to be considered as limted to the precise details of construction and arrangement herein disclosed by way of exemplification, since, as will be readily understood by those familiar with platen press loading and unloading equipment and operations, other variations and modifications are possible within the scope of the appended claims.

Having thus described our invention, we claim:

1. In loading apparatus for a multi-platen press, an elevator in alignment with the press at the front and accessible at one said for loading, and having shelves vertically spaced to register with the intervals between the press platens when the press is open; a charging table positioned laterally of the loading side of the elevator; means for moving the elevator step by step to bring its shelves to the level of the charging table from which sheets to be compacted are successfully fed into the loading side of the elevator; an ejector permanently embodied with and confined to movement longitudinally of the elevator by fixed guides on the latter, and operative when the elevator is charged and its shelves are registered with the intervals between the platens of the open press, to simultaneously push the sheets horizontally from the elevator into the press; and power means on the elevator for actuating the ejector.

2. Multi-platen press loading apparatus, according to claim 1, wherein the ejector comprises a carriage guided for travel back and forth horizontally of the elevator and having pusher bars extending crosswise of the intervals between the shelves, a reversible prime mover supported on the elevator, drive connections through which the ejector is moved back and forth along the elevator, manual means for starting the prime mover, and means operative to automatically stop the prime mover upon travel of the ejector to predetermined limits in opposite directions.

3. Multi-platen press loading apparatus, according to claim 1, wherein the ejector comprises a carriage guided for travel back and forth horizontally of the elevator and having pusher bars extending crosswise of the intervals between the shelves, a reversible prime mover supported on the elevator, drive connections through which the ejector is moved back and forth along the elevator, manual means for starting the prime mover, and means operative to automatically stop the prime motor in the event that the ejector encounters abnormal resistance incident to travel in either direction.

4. Multi-platen press loading apparatus, according to claim 1, wherein the ejector comprises a carriage guided for travel back and forth horizontally of the elevator and having pusher bars extending crosswise of the intervals between the shelves, a reversible electric motor supported on the elevator, drive connections by which the ejector is moved back and forth along the elevator, manual means for starting the motor, and automatic switch means operative to stop the motor upon travel of the ejector to predetermined limits in opposite directions.

5. Multi-platen press loading apparatus, according to claim 1, wherein the ejector comprises a carriage guided for travel back and forth horizontally of the elevator and having pusher bars extending crosswise of the intervals between the shelves, a reversible electric motor supported on the elevator, drive connections by which the ejector is moved back and forth along the elevator, manual means for starting the motor, and automatic switch means operative to stop the motor in the event that the ejector encounters abnormal resistance incident to travel in either direction.

6. Multi-platen press loading apparatus, according to claim 1, wherein the ejector comprises a carriage guided for travel back and forth horizontally of the elevator, and having pusher bars extending crosswise of the intervals between the shelves, rollers on the cross bars adapted to engage with the edges of metallic trays supporting the respective sheets, and reversible power means for moving the ejector back and forth along the elevator.

7. Multi-platen press loading apparatus, according to claim 1, wherein the ejector comprises carriages guided for movement along tracks at opposite sides of the elevator, uprights connected to the carriages, pusher bars extending crosswise of the uprights in the intervals between the shelves, and reversible power means for moving the ejector back and forth on the guide tracks.

8. Multi-platen press loading apparatus, according to claim 1, wherein the ejector comprises laterally-spaced upper and lower carriages with wheels confined to travel along horizontal tracks at the top and bottom of the elevator, uprights connecting the carriages, pusher bars extending crosswise between the uprights in the intervals between the shelves, a reversible electric motor mounted on one of the carriages for driving the wheels of said carriage, vertical shafts journalled in bearings on the uprights, and gear connections respectively between the vertical shaft and the wheel axles of the two carriages.

9. Multi-platen press loading apparatus, according to claim 1, wherein the ejector comprises laterally-spaced upper and lower carriages with wheels confined to travel along horizontal tracks at the top and bottom of the elevator, uprights connecting the carriages, pusher bars extending crosswise between the uprights in the intervals between the shelves; a reversible electric motor mounted on one of the carriages for driving the wheels of said carriage, vertical shafts journalled in bearings on the uprights, gear connections respectively between the vertical shafts and the wheel axles of the two carriages, spur pinions on the wheel axles of the respective carriages, and toothed rack bars adjacent the wheel tracks on the elevator with which the pinions mesh.

10. Multi-platen press loading apparatus, according to claim 1, wherein the shelves are in the form of grids with spaced side and intermediate bars between which freely revolving rollers for directly supporting the slabs or sheets are journalled at intervals.

11. Multi-platen press loading apparatus, according to claim 1, wherein the shelves are in the form of grids with spaced side and intermediate bars between which freely revolving rollers for directly supporting the sheets are journalled at intervals; and further including a plurality of columns extending up through voids in the shelves, and adapted, as each shelf is brought to the level of the charging table, to temporarily support upon their tops, the sheets as they are fed into the elevator, slightly above the rollers.

12. Multi-platen press loading apparatus, according to claim 1, wherein the shelves are in the form of grids with spaced side and intermediate bars between which freely revolving rollers for directly supporting the sheets are journalled at intervals; and further including a plurality of columns extending up through voids in the shelves, rollers at the tops of the columns with their axes at right angles to the first mentioned rollers, adapted, as each shelf is brought to the level of the charging table, to temporarily support the sheets, as they are fed into the elevator, slightly above said first mentioned rollers.

13. Multi-platen press loading apparatus, according to claim 1, wherein the shelves are in the form of grids with spaced side and intermediate bars between which freely-revolving rollers for directly supporting the sheets are journalled; and further including retractable transverse-axis rollers in longitudinal intervals between the first mentioned rollers adapted, as each shelf is brought to the level of the charging table, to temporarily support the sheets as they are fed into the elevator, slightly above said first mentioned rollers.

14. Multi-platen press loading apparatus, according to claim 1, wherein the shelves are in the form of grids with spaced side and intermediate bars between which freely-revolving rollers for directly supporting the sheets are journalled; and further including transverse axis rollers, arranged in the longitudinal intervals between the first mentioned rollers adapted, as each shelf is brought to the level of the charging table, to temporarily support the sheets as they are fed into the elevator, slightly above the first mentioned rollers, individual carrier arms for the temporary supporting rollers pivoted on the grid, and means whereby the arms can all be swung concurrently to retract the temporary supporting rollers and so allow the sheet to come to rest on the first mentioned rollers.

15. Multi-platen press loading apparatus, according to claim 1, wherein the shelves are in the form of grids with spaced side and intermediate bars between which freely-revolving rollers for directly supporting the sheets are journalled; and further including transverse axis rollers, arranged in the longitudinal intervals between the first mentioned rollers adapted, as each shelf is brought to the level of the charging table, to temporarily support the sheets as they are fed into the elevator, slightly above the first mentioned rollers, individual carrier arms for the temporary supporting rollers pivoted on the grid, longitudinally extending shafts journalled in the grid and to each of which an aligned group of the arms are secured, and means at one end of the grid whereby the several shafts can be concurrently turned for retraction of the temporary supporting rollers to allow the sheet to come to rest on the first mentioned rollers.

16. Multi-platen press loading apparatus, according to claim 1, wherein a vertically reading scale with graduations is provided on the elevator for coordination with a fixedly supported pointer to indicate to an operator the successive stations at which the elevator is to be stopped incident to feeding of the sheets.

17. Multi-platen press loading apparatus, according to claim 1, further including retractable yieldingly-urged detents on the elevator, fixed stops with which the detents cooperate to support the elevator in successive stop positions and when in fully raised position, and manually-controlled power means for retracting the detents to permit lowering of the elevator after the sheets have been transferred therefrom to the press.

18. Multi-platen press loading apparatus, according to claim 1, further including retractable yieldingly-urged detents on the elevator; fixed upright bevel toothed racks with which the detents cooperate to support the elevator after being raised to the successive stop positions, and manually-controlled power means for retracting the detents to permit lowering of the elevator after the sheets have been transferred therefrom to the press.

19. Loading apparatus for a multi-platen press, according to claim 1, further including means to prevent operation of the ejector when the press is closed.

20. Loading apparatus for a multi-platen press, according to claim 1, further including means to prevent operation of the elevator while the ejector is in motion.

21. Loading apparatus for a multi-platen press, according to claim 1, further including means to prevent actuation of the ejector until the loading elevator has been fully raised to indexing position.

22. Platen press loading apparatus, according to claim 1, wherein the elevator operating means includes a ram, a reversible valve for governing supply and exhaust of fluid pressure to and from the ram, electric means for actuating the valve, manual means for controlling current flow to the electric means to actuate the valve for admission of fluid pressure to the ram when the elevator is to be raised, and separate manual means for controlling current flow to said electric means to actuate the valve for exhaust of the ram when the elevator is to be lowered.

23. Platen press loading apparatus, according to claim 1, further including yieldingly-urged detents on the elevator; fixed upright bevel toothed racks with which the detents cooperate to support the elevator in successive stop positions, an operating cylinder connected to the detents; a valve with electric actuating means for governing supply of fluid pressure to the cylinder for retraction of the detents when the elevator is to be lowered, and manual means for controlling current flow to said valve actuating means.

24. Platen press loading apparatus, according to claim 1, wherein the elevator operating means includes a hydraulic ram, a reversible valve for governing supply and exhaust of fluid pressure to and from the ram, electric means for actuating the valve, manual means for controlling current flow to the electric means to actuate the valve for admission of fluid pressure to the ram when the elevator is to be raised, separate manual means for controlling current flow to said electric means for actuation of the valve to exhaust of the ram when the elevator is to be lowered; further comprising yieldingly-urged detents on the elevator, fixed upright racks with which the detents cooperate to support the elevator in successive stop positions, an operating cylinder connected to the detents, a valve with electric actuating means for governing supply of pressure fluid to the cylinder for retraction of the detents, and circuit connections with the second of the aforesaid manual means whereby the actuating means of the last mentioned valve is energized to set said valve for admission of fluid pressure to the cylinder for retraction of the detents from the racks, when the elevator is to be lowered.

25. In loading apparatus for multi-platen press, an aligned elevator with shelves vertically spaced to correspond with the intervals between the press platens when the press is open; a charging table positioned laterally of the elevator; means for moving the elevator step by step to bring its shelves successively to the level of the charging table from which sheets to be compacted are fed edgewise into the corresponding side of the elevator; and an ejector operative when the elevator is charged and its shelves are in registry with the spaces between the platens of the open press, to simultaneously push the sheets horizontally from the elevator into the press, said ejector comprising carriages guided for movement along tracks at opposite sides of the elevator, uprights connected to the carriages, pusher bars extending crosswise of the uprights in the intervals between the shelves, screw spindles journalled in fixed bearings, nut sleeves on the carriages in threaded engagement with the respective spindles, and reversible power means for concurrently driving the spindles to move the ejector back and forth on the guide tracks.

26. Multi-platen press loading apparatus, according to claim 25, further including bearings in which the nut sleeves are supported with capacity for axial adjustment to prevent binding of the screw spindles.

27. In loading apparatus for multi-platen press, an aligned elevator with shelves vertically spaced to correspond with the intervals between the press platens when the press is open; a charging table positioned laterally of the elevator; means for moving the elevator step by step to bring its shelves successively to the level of the charging table from which sheets to be compacted are fed edgewise into the corresponding side of the elevator; and an ejector operative when the elevator is charged and its shelves are in registry with the spaces between the platens of the open press, to simultaneously push the sheets horizontally from the elevator into the press, said ejector comprising wheeled carriages guided for movement along tracks at opposite sides of the elevator, uprights connected to the carriages, pusher bars extending cross wise of the uprights in the intervals between the shelves, screw spindles journalled in fixed bearings, nut sleeves on the carriages in threaded engagement with the respective spindles, a reversible electric motor mounted on the elevator, and connections through which the spindles are concurrently driven from the motor to move the ejector back and forth on the guide tracks, and automatic switch means for stopping the motor upon movement of the ejector to prescribed limits in opposite directions.

28. In loading apparatus for a multi-platen press, an elevator with shelves vertically spaced to correspond with the spacing of the press platens when the press is open, a charging table, a ram for operating the elevator, an electrically-actuated valve for governing supply and exhaust of fluid pressure to the ram to raise or lower the elevator, yieldingly-urged retractable detents cooperative with stationary toothed racks to support the elevator as its shelves are successively presented to the charging table for reception of sheets to be compacted, an ejector guided for travel back and forth horizontally of the elevator and having pusher bars extending crosswise of the intervals between the shelves, a reversible electric motor with drive connections for moving the ejector as aforesaid; a wiring system including a current with interposed manual means for controlling current flow to the valve for raising and lowering the elevator, separate circuit with interposed manual means for controlling flow of current to the motor, switch means automatically actuated by the press in closing to break the circuit through the motor and thereby prevent operation of the ejector while the press is closed, and other switch means automatically operated by the ejector as it begins its active travel, to interrupt the circuit through the electric valve actuating means and thereby prevent operation of the elevator until the ejector has returned to its normal inactive position.

29. In loading apparatus for a multi-platen press, an elevator with shelves vertically spaced to correspond with the spacing of the press platens when the press is open, a charging table, a ram for operating the elevator, an electrically-actuated valve for governing supply and exhaust of fluid pressure to the ram to raise or lower the elevator, yieldingly-urged retractable detents cooperative with stationary toothed racks to support the elevator as its shelves are successively presented to the charging table for reception of sheets to be compacted, an ejector guided for travel back and forth horizontally of the elevator and having pusher bars extending crosswise of the intervals between the shelves, a reversible electric motor with drive connections for moving the ejector as aforesaid; a wiring system including a circuit with interposed manual means for controlling current flow to the valve for raising and lowering the elevator, a separate circuit with interposed manual means for controlling flow of current to the motor, a normally open switch in the latter circuit, and means whereby said switch is closed by the elevator when in raised indexing position to permit operation of the motor for actuation of the ejector.

30. In loading apparatus for a multi-platen press, an elevator with shelves vertically spaced to correspond with the spacing of the press platens when the press is open, a charging table, a ram for operating the elevator, an electrically-actuated valve for governing supply and exhaust of fluid pressure to the ram to raise or lower the elevator, yieldingly-urged retractable detents cooperative with stationary toothed racks to support the elevator as its shelves are successively presented to the charging table for reception of sheets to be compacted, an ejector guided for travel back and forth horizontally of the elevator and having pusher bars extending crosswise of the intervals between the shelves, a reversible electric motor with drive connections for moving the ejector as aforesaid, a wiring system including a circuit with interposed manual means for controlling current flow to the valve for raising and lowering the elevator, a separate circuit with interposed manual means for controlling flow of current to the motor, switch means automatically opened by the press as the latter is closed and instrumental in preventing operation of the ejector actuating motor until the press is re-opened.

31. In loading and unloading apparatus for a multi-platen press, an elevator in alignment with the press at the front and accessible at one side for loading, and having shelves vertically spaced to register with the intervals between the press platens when the press is open; a charging table positioned laterally of the loading side of the elevator; an unloading elevator similar to the loading conveyer and accessible at one side for unloading; a receiving table positioned laterally of the unloading side of the unloading elevator; means for moving the loading elevator step by step to bring its shelves to the level of the charging table from which sheets to be compacted are successively fed; separate means for similarly moving the unloading elevator relative to the receiving table; and an ejector permanently embodied with and confined to movement longitudinally of the loading elevator by fixed guides on the latter, and operative when the loading elevator is charged and its shelves and those of the unloading elevator are registered with the intervals between the platens of the open press, to simultaneously push the sheets horizontally into the press with incidental transfer of previously compacted sheets from the press onto the unloading elevator by the newly introduced sheets.

References Cited in the file of this patent

UNITED STATES PATENTS

| | | |
|---|---|---|
| 1,268,663 | Alvey | June 4, 1918 |
| 1,773,163 | Becker | Aug. 19, 1930 |
| 1,776,201 | St. Clair et al. | Sept. 16, 1930 |
| 1,879,713 | Scott | Sept. 27, 1932 |
| 2,264,826 | Butterfield | Dec. 2, 1941 |
| 2,420,813 | Camerota | May 20, 1947 |
| 2,438,896 | Bowen et al. | Apr. 6, 1948 |
| 2,612,275 | Chapman | Sept. 30, 1952 |

FOREIGN PATENTS

| | | |
|---|---|---|
| 433,778 | Great Britain | Aug. 15, 1935 |